US012162049B2

(12) United States Patent
Hase

(10) Patent No.: US 12,162,049 B2
(45) Date of Patent: Dec. 10, 2024

(54) AGRICULTURAL CONTAINER CLEANING SYSTEM

(71) Applicant: Heston Hase, Jonesboro, IL (US)

(72) Inventor: Heston Hase, Jonesboro, IL (US)

( * ) Notice: Subject to any disclaimer, the term of this patent is extended or adjusted under 35 U.S.C. 154(b) by 0 days.

(21) Appl. No.: 18/133,661

(22) Filed: Apr. 12, 2023

(65) Prior Publication Data

US 2024/0342770 A1 Oct. 17, 2024

(51) Int. Cl.
*B08B 9/093* (2006.01)
*B08B 9/08* (2006.01)

(52) U.S. Cl.
CPC ............ *B08B 9/093* (2013.01); *B08B 9/0821* (2013.01); *B08B 9/0861* (2013.01); *B08B 2209/08* (2013.01)

(58) Field of Classification Search
CPC ..... B08B 9/093; B08B 9/0821; B08B 9/0861; B08B 9/20; B08B 9/28; B08B 9/34; B08B 2209/08
See application file for complete search history.

(56) References Cited

U.S. PATENT DOCUMENTS

| | | | | |
|---|---|---|---|---|
| 2,777,256 A | | 1/1957 | Paasche | |
| 5,107,876 A | * | 4/1992 | Ozyjiwsky ............ | B08B 15/026 134/111 |
| 5,704,380 A | * | 1/1998 | Zelniker ............. | A47L 15/0073 134/98.1 |
| 5,964,949 A | | 10/1999 | Savas | |
| 2002/0144714 A1 | | 10/2002 | McCasker | |
| 2010/0108102 A1 | * | 5/2010 | Kehl .................. | A47L 15/4282 134/25.2 |
| 2014/0069462 A1 | * | 3/2014 | Becker ................ | A47L 15/4219 134/10 |
| 2020/0078832 A1 | * | 3/2020 | Pawlowski .............. | C23G 3/00 |

FOREIGN PATENT DOCUMENTS

| | | | |
|---|---|---|---|
| AT | 171777 | B | 7/1952 |
| AT | 444816 | T | 10/2009 |
| BR | 0808626 | A2 | 3/2019 |
| CN | 112620207 | A | 4/2012 |

(Continued)

OTHER PUBLICATIONS

Machine translation: DE 202022100151 (Year: 2022).*

*Primary Examiner* — Natasha N Campbell
(74) *Attorney, Agent, or Firm* — Tucker Ellis LLP

(57) ABSTRACT

One or more techniques and/or systems are disclosed for agricultural container cleaning that includes a cleaning system having a support member having a platform configured to support an agricultural container thereon, wherein the platform is configured to rotate with the agricultural container supported thereon. The cleaning system further includes at least one reservoir configured to store a fluid, a vertical spray portion arranged along a first axis and fluidly coupled to the at least one reservoir, and a horizontal spray portion arranged along a second axis fluidly coupled to the at least one reservoir, wherein the first axis is different than the second axis. The cleaning system also includes a plurality of spray bars coupled to the vertical spray portion and the horizontal spray portion, wherein each spray bar of the plurality of spray bars includes a plurality of nozzles configured to spray the fluid therefrom.

20 Claims, 14 Drawing Sheets

(56) References Cited

FOREIGN PATENT DOCUMENTS

| | | | | |
|---|---|---|---|---|
| CN | 104014497 | A1 | 9/2014 | |
| CN | 105457961 | A | 4/2016 | |
| CN | 105195484 | A | 1/2018 | |
| CN | 108745974 | A | 11/2018 | |
| CN | 110639868 | A | 1/2020 | |
| DE | 2751875 | A1 | 5/1979 | |
| DE | 3207508 | A1 | 9/1983 | |
| DE | 3436865 | A1 | 6/1986 | |
| DE | 9417631 | U1 | 1/1995 | |
| DE | 4443583 | | 6/1996 | |
| DE | 102004050673 | A1 | 4/2006 | |
| DE | 202022100151 | U1 * | 2/2022 | ............. B08B 3/022 |
| EP | 3736054 | A1 | 11/2020 | |
| FR | 1309089 | A | 11/1965 | |
| FR | 2758746 | | 7/1998 | |
| FR | 2939337 | | 6/2010 | |
| GB | 520030 | A | 4/1940 | |
| GB | 634315 | A | 3/1950 | |
| GB | 669366 | A | 4/1952 | |
| GB | 695764 | A | 8/1953 | |
| GB | 777826 | A | 6/1957 | |
| GB | 1014118 | A | 12/1965 | |
| GB | 2329576 | | 3/1999 | |
| WO | 9216314 | A1 | 10/1992 | |

* cited by examiner

AGRICULTURAL CONTAINER CLEANING SYSTEM

BACKGROUND

Containers for storing and transporting different goods and materials, such as bulk seed, can be used many times. That is, the containers (e.g., seed boxes) are made to be filled and emptied many times. As the number of uses increases, the amount of dirt and other debris that accumulates on the outside of the containers can increase. This accumulation on the outside of the containers is not only aesthetically unappealing, but can affect the containers, such as potentially contaminate subsequent goods and materials stored in previously used containers. Cleaning containers can also extend the life of the containers.

In some applications, a large number of containers are used and need to be cleaned for the next use. As such, fast and efficient cleaning without complex system components is desirable in order to reduce the cost associated with cleaning (e.g., labor intensive cleaning that is not suitable for high volume processes or using complex conveyor cleaning systems).

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

One or more techniques and systems are described herein for cleaning containers, particularly agricultural containers that can be used to store and transport different seeds. For example, a cleaning system that rotates the container while applying pressurized liquid from one or more spray bars allows for simple, efficient, and effective cleaning of the outside of the agricultural containers.

In one implementation, a cleaning system comprises a support member having a platform configured to support an agricultural container thereon, wherein the platform is configured to rotate with the agricultural container supported thereon. The cleaning system further comprises at least one reservoir configured to store a fluid, a vertical spray portion arranged along a first axis and fluidly coupled to the at least one reservoir, and a horizontal spray portion arranged along a second axis fluidly coupled to the at least one reservoir, wherein the first axis is different than the second axis. The cleaning system also comprises a plurality of spray bars coupled to the vertical spray portion and the horizontal spray portion, wherein each spray bar of the plurality of spray bars includes a plurality of nozzles configured to spray the fluid therefrom. The plurality of spray bars are operable to spray the fluid on an exterior of the agricultural container as the agricultural container is rotated by the platform.

In another implementation, a method for cleaning an agricultural container comprises configuring a platform to rotate an agricultural container during cleaning and configuring a plurality of spray bars to apply pressurized fluid to the rotating agricultural container. The method further comprises controlling the platform and the plurality of spray bars to clean the agricultural container, wherein the controlling comprises selectively applying a cleaning agent and selectively applying pressurized water to the agricultural container as the agricultural container is rotating.

To the accomplishment of the foregoing and related ends, the following description and annexed drawings set forth certain illustrative aspects and implementations. These are indicative of but a few of the various ways in which one or more aspects may be employed. Other aspects, advantages and novel features of the disclosure will become apparent from the following detailed description when considered in conjunction with the annexed drawings.

BRIEF DESCRIPTION OF THE DRAWINGS

The examples disclosed herein may take physical form in certain parts and arrangement of parts, and will be described in detail in this specification and illustrated in the accompanying drawings which form a part hereof and wherein.

DETAILED DESCRIPTION

Figure 1:
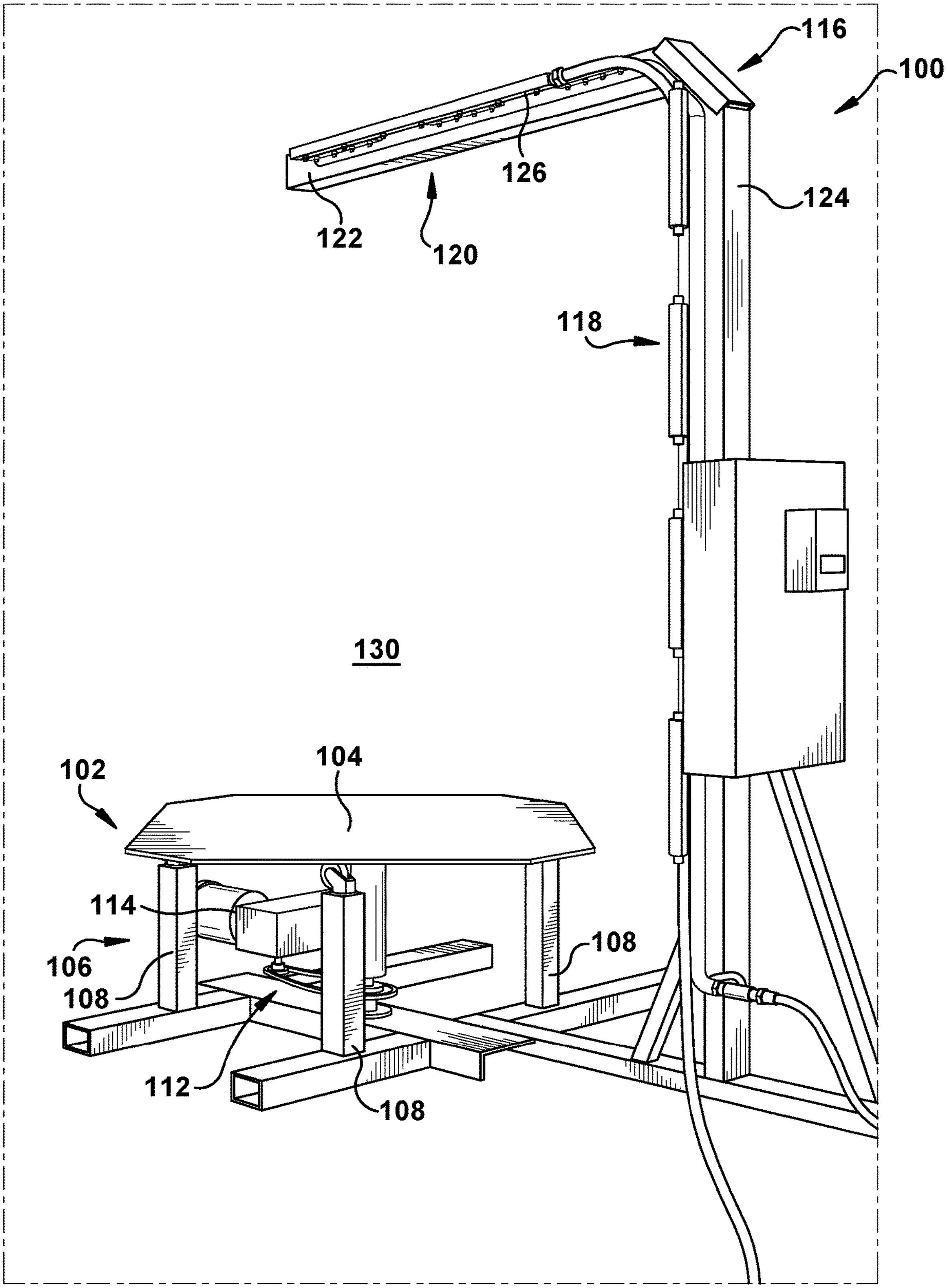
FIG. 1 is a diagram of an example cleaning system according to an implementation.
Figure 2:
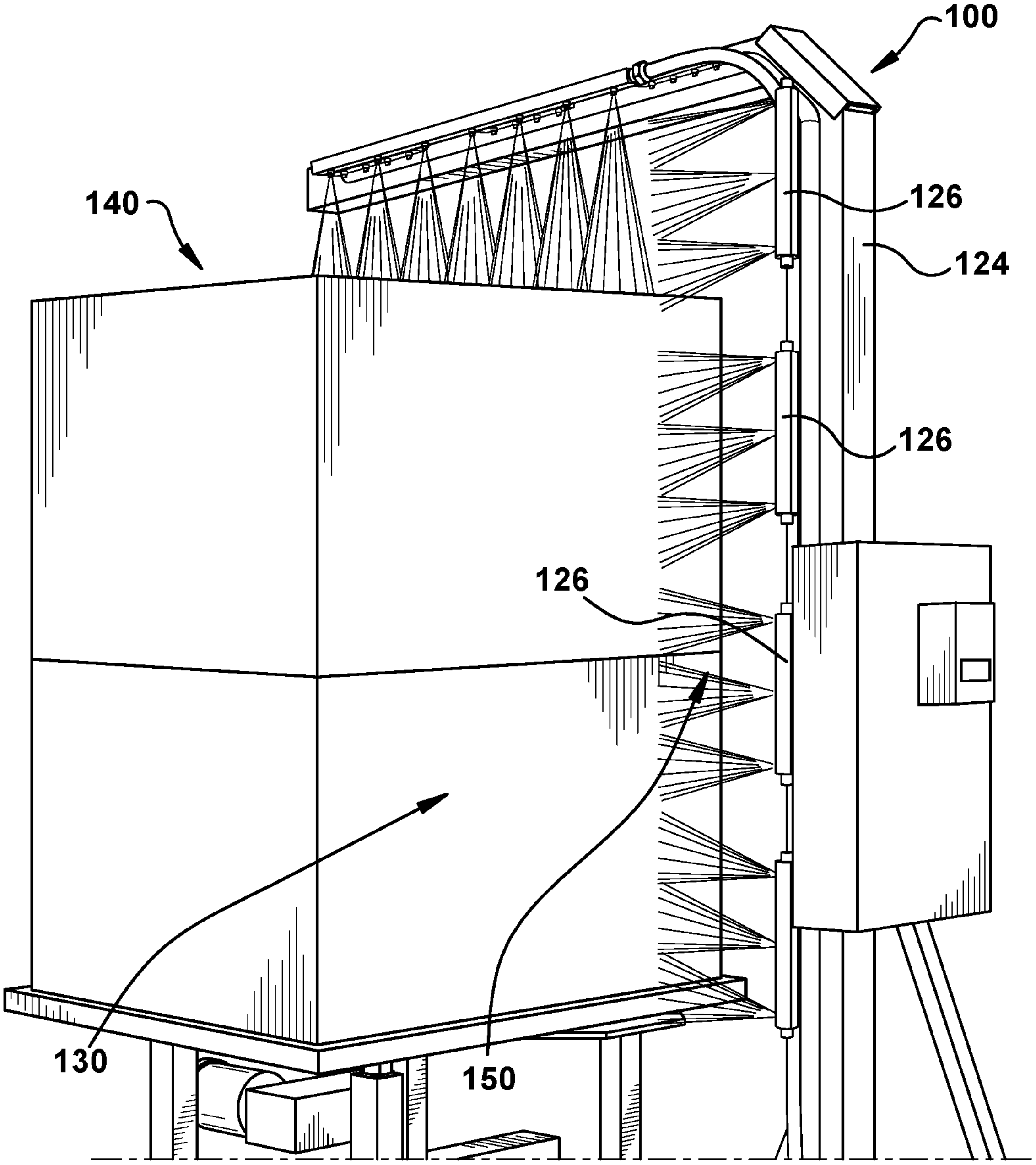
FIG. 2 is a diagram illustrating operation of cleaning system of FIG. 1.
Figure 3:
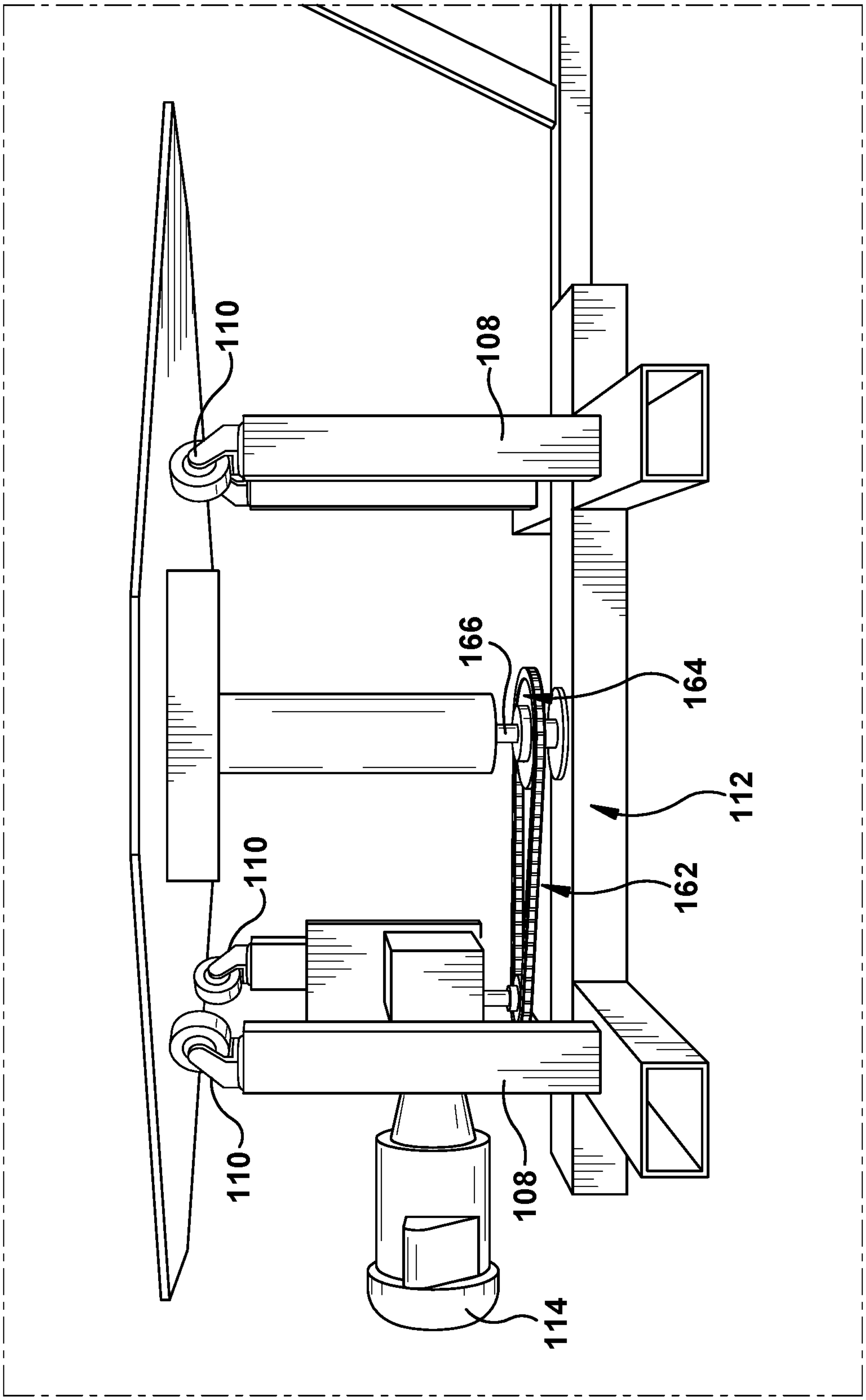
FIG. 3 is a diagram illustrating a support member of a cleaning system according to an implementation.
Figure 4:
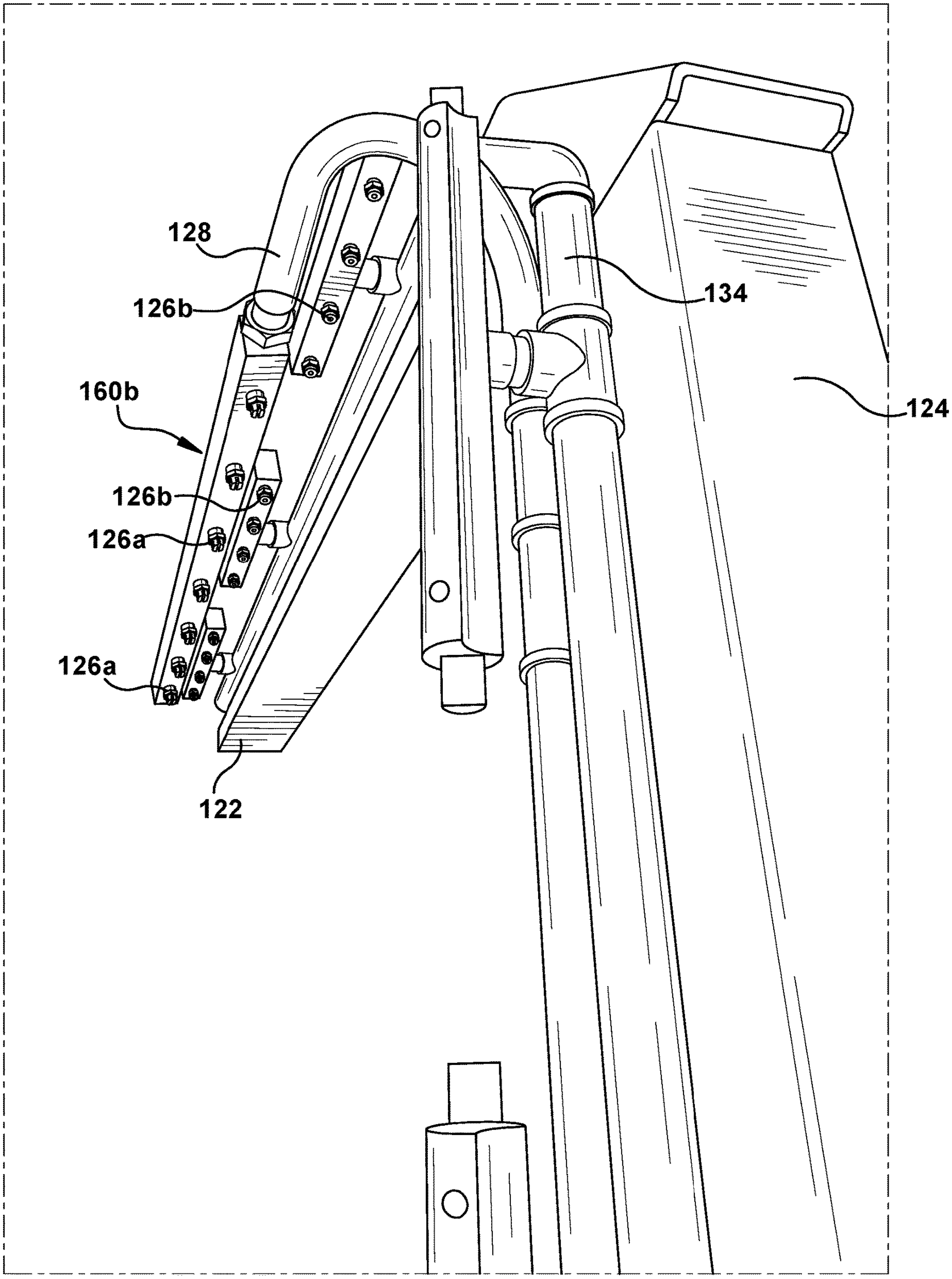
FIG. 4 is a diagram illustrating spray bars of a cleaning system according to an implementation.
Figure 5:
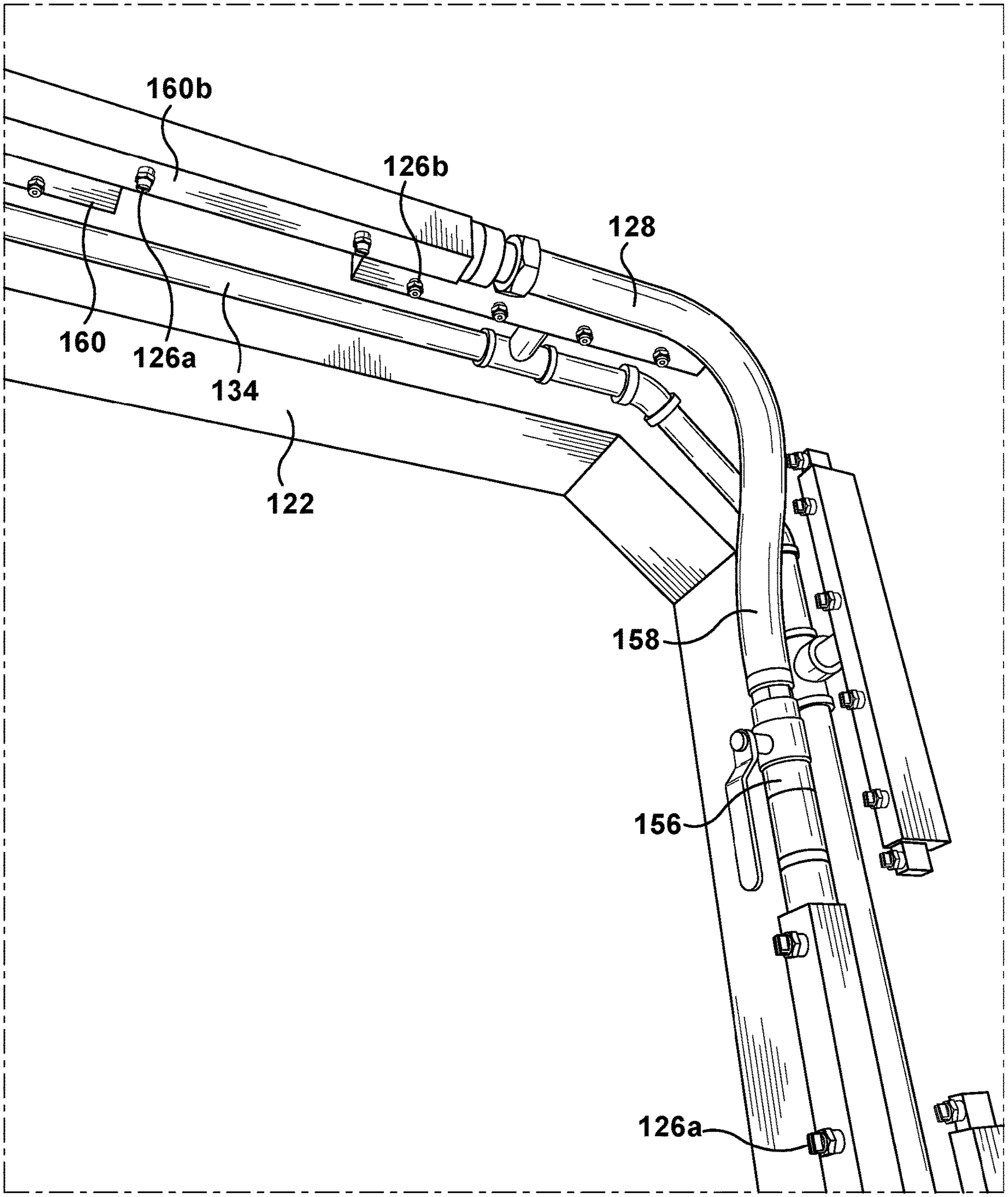
FIG. 5 is a another diagram illustrating spray bars of a cleaning system according to an implementation.
Figure 6:
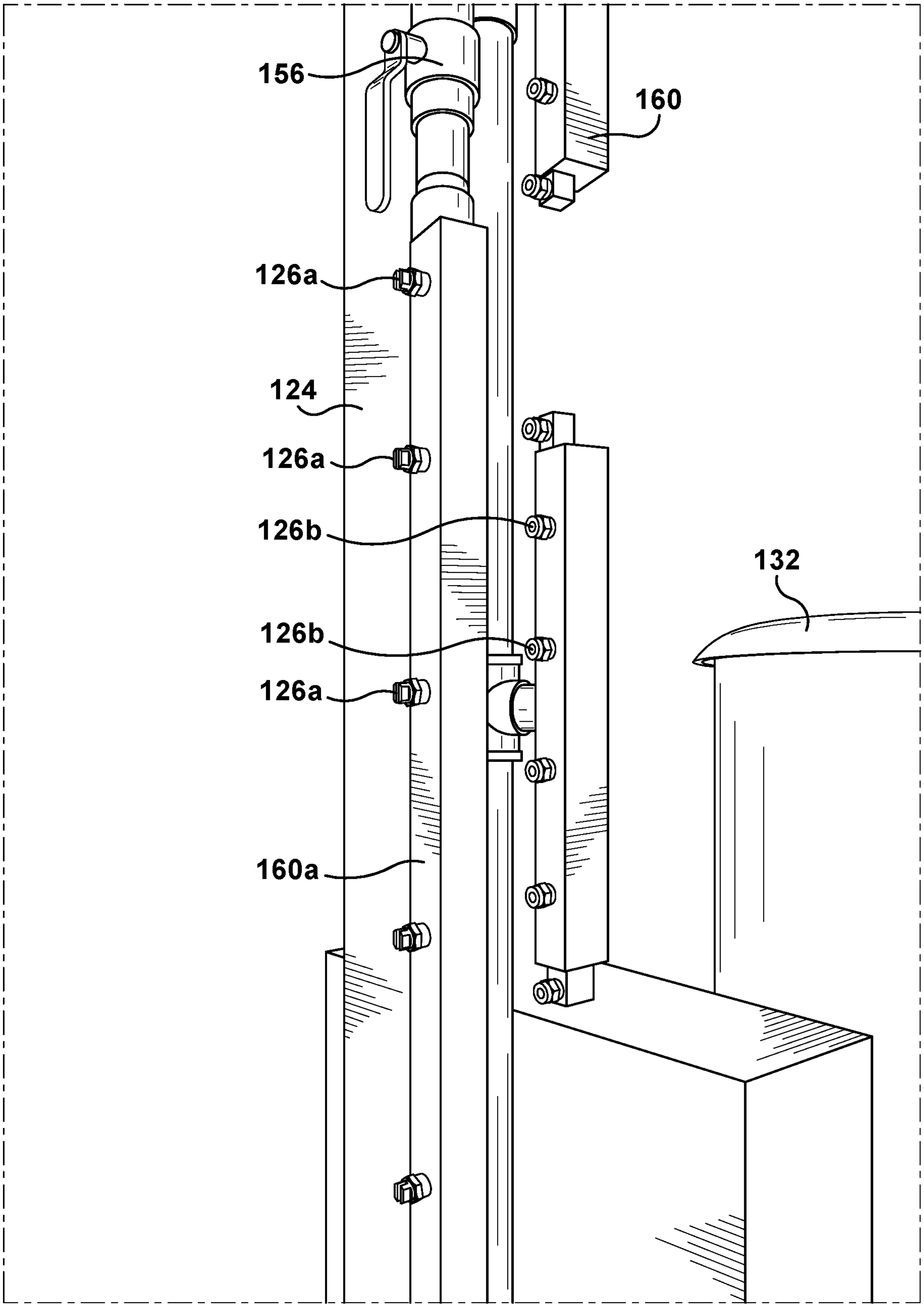
FIG. 6 is another diagram illustrating spray bars of a cleaning system showing nozzles according to an implementation.
Figure 7:
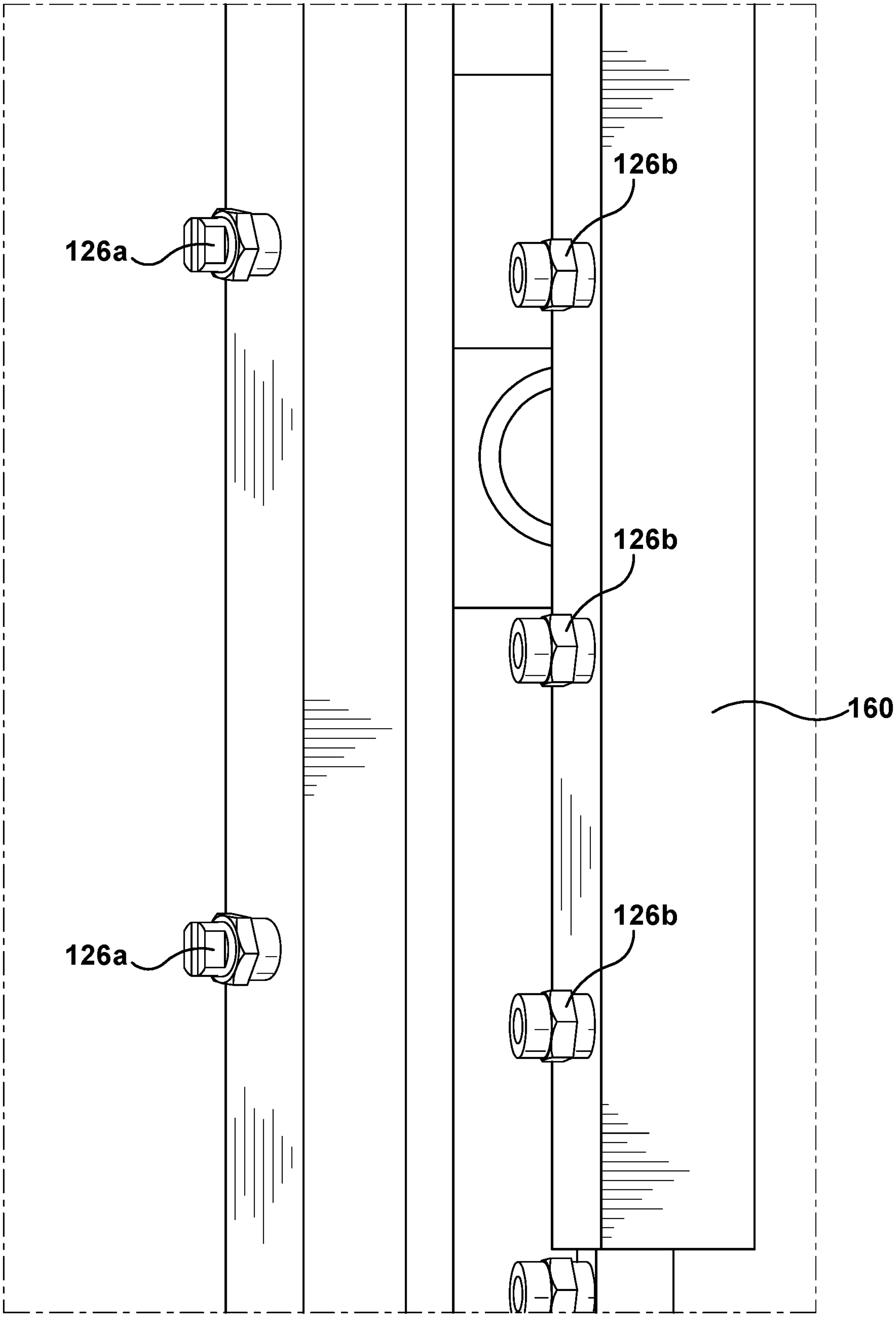
FIG. 7 is a diagram illustrating nozzles of spray bars according to an implementation.
Figure 8:
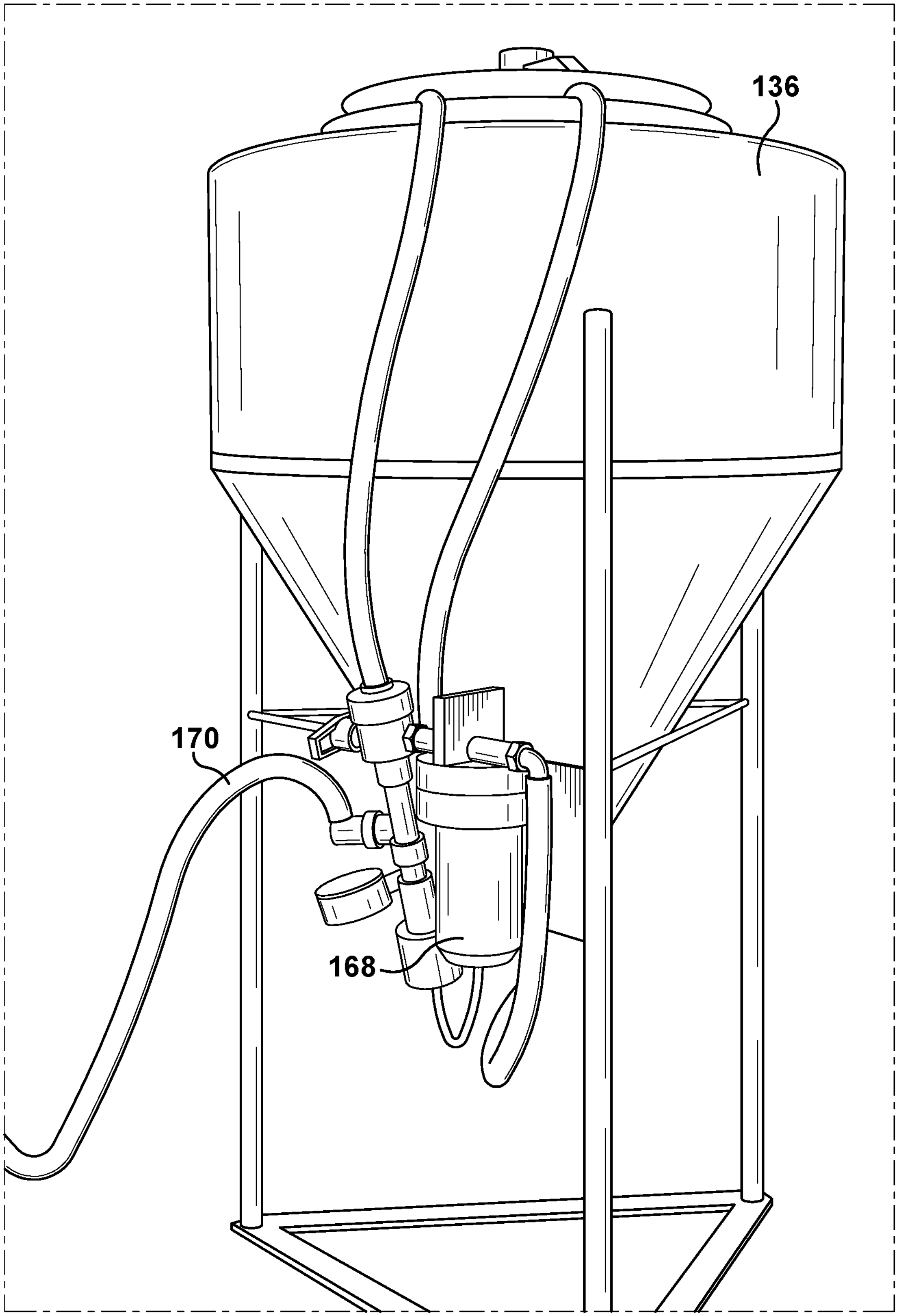
FIG. 8 is a diagram illustrating a reservoir according to an implementation.
Figure 9:
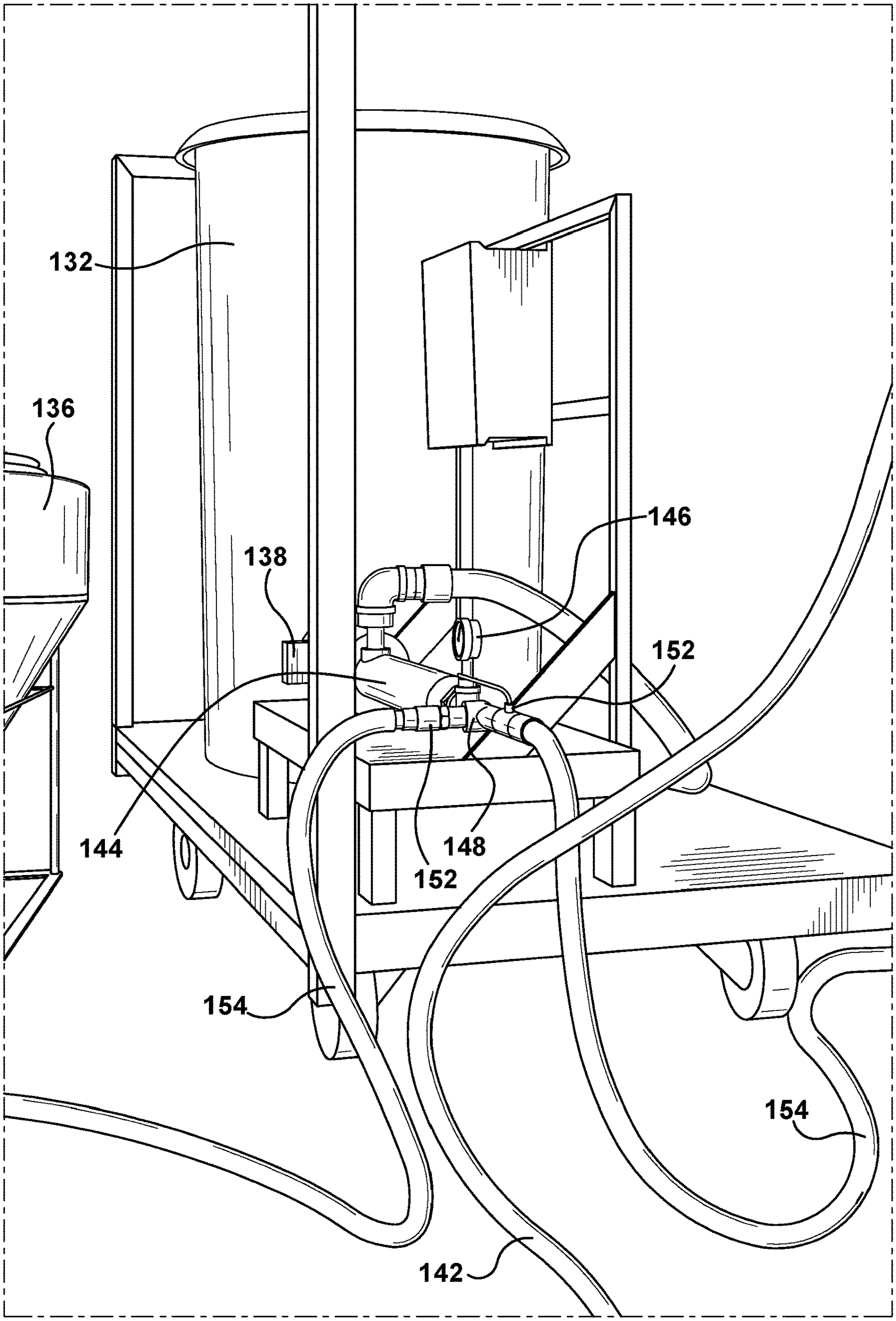
FIG. 9 is another diagram illustrating a reservoir according to an implementation.

The claimed subject matter is now described with reference to the drawings, wherein like reference numerals are generally used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are shown in block diagram form in order to facilitate describing the claimed subject matter.

The methods and systems disclosed herein, for example, may be suitable for use in different applications, such as for different container cleaning applications, such as for containers having different configurations, uses, etc. That is, the herein disclosed examples can be implemented for cleaning containers other than agricultural containers, such as other than for storing and transporting seeds. As such, one or more examples are useful in washing agricultural seed boxes and other containers, particularly for cleaning containers used in the agricultural seed industry, where planting seed is generated in high volumes by large seed manufacturers (e.g., hundreds of seed boxes per day that each store approximately 50 acres of seed). However, one or more implementations can be used to clean different portions of different types of containers and are not limited to the herein described containers. For example, while seed containers can be cleaned, other containers for storing or transporting other types of product or material can be cleaned, such as containers for liquid fertilizers.

In various examples, prior to filling, or on return from field customers and farmer end users, the seed boxes, that are often dirty, littered with debris and not suitable for filling with new seed, are cleaned using rotational spinning of the container while apply pressurized fluid to an outer surface of the container. In other examples, other types of containers, such as having liquid fertilizer are cleaned prior to subsequent use, wherein pressurized fluid is additionally or optionally applied to an inner surface of the container. As such, human operators with high-pressure power washers are not needed to spray and wash the containers with the herein described implementations of a container cleaning system that allows for effective and high volume cleaning to wash agricultural containers, such as agricultural seed boxes and other similar containers, to support high volume industrial processes.

FIGS. 1-10 illustrate example implementations of a system that may utilize one or more portions of the aspects and examples described herein. In the implementation illustrated in these figures, a cleaning system 100 is shown that allows, for example, for washing large agricultural seed boxes, particularly the exterior or external surfaces of the agricultural seed boxes, although other uses are contemplated, such as for clearing the interior or internal surfaces of liquid fertilizer containers, as described in more detail. The cleaning system 100 includes a support member 102 that is configured to support and rotate a container 140 to be cleaned. The support member 102 includes a planar surface 104 (e.g., a platform) supported on a base 106 having a plurality of legs 108, with each leg 108 having a rotatable member 110 (e.g., a wheel or roller, which may be one-way or two-way rollers) on which the planar surface 104 is movably supported, and together define a base structure. That is, each of the legs 108 includes a rotatable member 110 at a top end (as viewed in FIG. 1) that allows the planar surface 104 to rotate or spin about an axis centered within the cleaning system 100. In the illustrated example, a drive member 112 is configured to rotate the planar surface 104 that is movably supported on the rotatable members 110. As such, in operation, the drive member 112 is operable to apply a rotating force to the planar surface 104 to cause the planar surface 104 to rotate about the axis and supported by the rotatable members 110.

In one example, the drive member 112 is coupled with a motor 114 that causes the drive member 112 that is engaged with the planar surface 104 to spin or rotate about the axis. As should be appreciated, the drive member 112 is capable of causing rotation at different speeds (e.g., different revolutions per minute (RPMs)) and in different directions (clockwise or counterclockwise). The rotational speed can be adjusted based on different factors or criteria, such as the configuration of the container 140, a desired cleaning level of dirt, the pressure level of the applied cleaning fluid, etc. It should be noted that although the configuration illustrated in FIG. 1 is a chain type drive member 112, different drive mechanisms and arrangements are contemplated. For example, any drive arrangement that causes the planar surface 104 to spin or rotate to allow cleaning of the container 140 can be used.

The cleaning system 100 further includes a cleaner dispensing portion 116 that is configured to spray water or other cleaning agents towards the container 140 supported on the planar surface 104 within a cleaning area 130. In the illustrated example, the cleaner dispensing portion 116 includes a vertical spray portion 118 and a horizontal spray portion 120. The vertical spray portion 118 and a horizontal spray portion 120 are shown as part of an integrated unit, but can be separate members or elements in other configurations. As such, the vertical spray portion 118 is arranged along a first axis and the horizontal spray portion 120 is arranged along a second axis perpendicular to the first axis.

The vertical spray portion 118 includes a vertical support member 122 and the horizontal spray portion 120 includes a horizontal support member 124. Each of the vertical support member 122 and the horizontal support member 124 allow for dispensing or spraying of fluids using a plurality of nozzles 126, illustrated as spray nozzles capable of spraying pressurized fluid 150 into the cleaning area 130. The plurality of nozzles 126 are spaced apart linearly along spray bars 160 of the vertical support member 122 and the horizontal support member 124. In some examples, the spacing between nozzles 126 is the same, while in other examples, the spacing between nozzles 126 can be varied. Additionally, the spray pattern and/or spray direction of the plurality of nozzles 126 is configured to provide complete spray coverage within the cleaning area 130 as the container 140 is spun or rotated about the axis.

In the illustrated example, the plurality of nozzles 126 include two sets of adjacent nozzles 126 (e.g., parallel sets of spray bars 160) that can be alternately or offset in spacing. For example, the spacing between the nozzles **126*a* and the spacing between the nozzles 126*b* can be the same or different. Additionally, the nozzles 126*a* and the nozzles 126*b* extend along parallel axis that are spaced apart in some examples. In some examples, the number of nozzles 126*a* and the number of nozzles 126*b* are the same. In other examples, the number of nozzles 126*a* and the number of nozzles 126*b* are different. Additionally, the of nozzles 126*a* and the of nozzles 126*b* can extend along different lengths of the vertical support member 122 and the horizontal support member 124**, thereby defining different spray portions (e.g., different sized spray bar areas).

In various examples, the nozzles **126*a* extend along a single length of the vertical support member 122 and the horizontal support member 124 extend along one or more smaller lengths of the vertical support member 122 and the horizontal support member 124, as part of multiple spray bars 160. In one particular implementation, the nozzles 126*a* extend along a longer single length of the vertical support member 122 and the horizontal support member 124 and the nozzles 126*b* extend along multiple smaller lengths of the vertical support member 122 and the horizontal support member 124. In the illustrated example, the nozzles 126*a* define a single spray arm region along each of the vertical support member 122 and the horizontal support member 124 and the nozzles 126*b* define multiple spray arm regions along each of the vertical support member 122 and the horizontal support member 124. It should be noted that while the nozzles 126*b* are illustrated as part of separate smaller spray arm portions (e.g., spray bars 160), in some examples, a longer spray arm portion with groups of spaced apart nozzles 126***b* can be provided. Additionally, while the spray bars 160 are illustrated as fixed, the spray bars 160 in some examples are movable, such as manually adjustable.

In various examples, the nozzles 126*a* are configured for one type of operation and the nozzles 126*b* are configured for another type of operation. That is, the type of nozzles 126, size of nozzles 126, spacing of nozzles 126, opening size of the nozzles 126, etc. are provided based on the operation desired or needed. In one example, the nozzles 126*a* are configured to dispense water as a high pressure spray and the nozzles 126*b* are configured to dispense a cleaning agent (e.g., liquid soap) at a lower pressure spray, which in some examples is a pre-soaking soaping prior to the high pressure water application.

The two sets of adjacent nozzles 126 form part of different dispensing systems, for example, the nozzles 126*a* are configured to dispense a cleaning agent and the nozzles 126*b* are configured to dispense water. Each of the sets of nozzles 126 are independently controllable to apply, for example, the cleaning agent and the water at different times. In one example, the nozzles 126*a* are connected to a feed tube 128 (e.g., pipe or other fluid passageway or conduit) fluidly coupled with a first reservoir 132 and the nozzles 126*b* are connected to a feed tube 134 (e.g., pipe or other fluid passageway or conduit) fluidly coupled with a second reservoir 136. As such, different fluids are capable of being dispensed from the first and second reservoirs 132, 136 through the nozzles 126*a*, 126*b* respectively. It should be noted that the configuration of the feed tubes 128, 134 can be the same or different. For example, the diameter of the feed tubes 128, 134 can be configured based on the type of fluid passing there through, a desired or required flow rate of fluid there through, etc.

In the illustrated example, the plurality of nozzles 126 are spaced apart linearly along the vertical support member 122 and the horizontal support member 124. In other examples, one or more nozzles 126 can be provided along an angled portion of the cleaner dispensing portion 116 between the vertical support member 122 and the horizontal support member 124.

In various examples, a pump 138 is operable to transfer the fluid to the nozzles 126*a* through the feed tube 128 (e.g., pipe or other fluid passageway or conduit) from the first reservoir 132 and the to the nozzles 126*b* through the feed tube 134 (e.g., pipe or other fluid passageway or conduit) from the second reservoir 136. That is, the pump 138 provides pressurized fluid at the nozzles 126*a*, 126*b* for dispensing as a pressurized spray. In one example, the pump 138 is selectively operable to provide fluid to the nozzles 126*a*, the nozzles 126*b*, or both the nozzles 126*a*, 126*b*. In another example, separate pumps 138 are provided to provide fluid to the nozzles 126*a* and to the nozzles 126*b*. The pump 138 is controllable to provide the fluid to the 126*a*, 126*b* at different pressures, such as based on a desired or required application.

Figure 10:
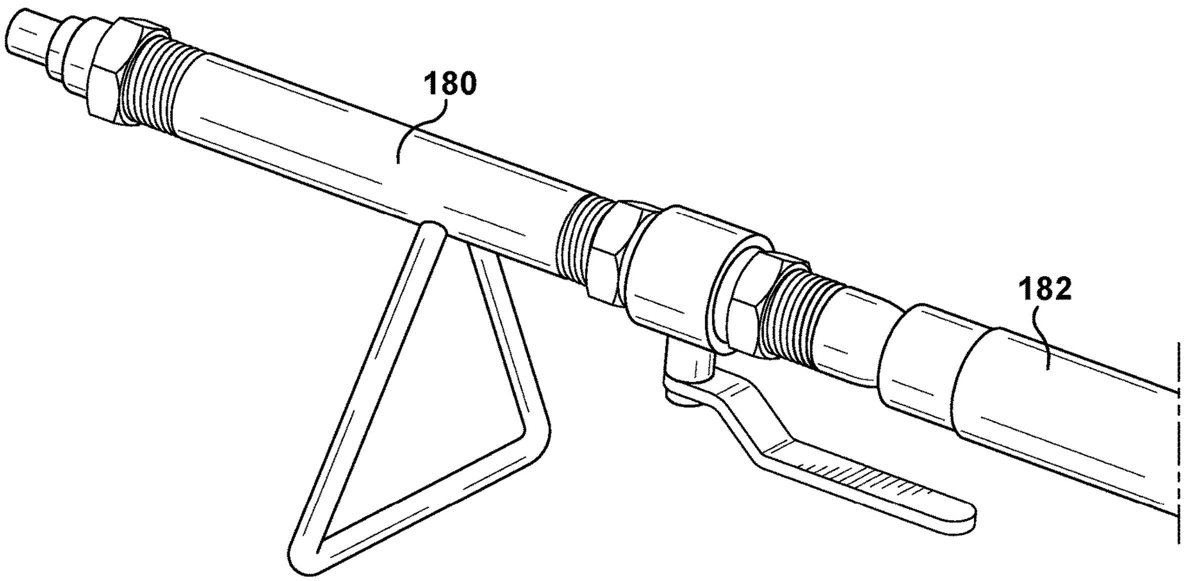
FIG. 10 is a diagram illustrating a handheld nozzle sprayer according to an implementation.

In some examples, additional dispensing devices are provided. For example, as shown in FIG. 10, a handheld nozzle sprayer 180 is provided and connected to at least one of the first and second reservoirs 132, 136. In one particular implementation, the handheld nozzle sprayer 180 is selectively fluidly coupled to either one of the first and second reservoirs 132, 136. That is, the handheld nozzle sprayer 180 is capable of dispensing pressurized fluid from either of the first and second reservoirs 132, 136 and activated via a hand control (e.g., lever or switch) on the handheld nozzle sprayer 180. In one example, the pump 138 is also configured and operable to provide pressurized fluid to the handheld nozzle sprayer 180 from the first and second reservoirs 132, 136. The handheld nozzle sprayer 180 is fluidly coupled to the first and second reservoirs 132, 136 using a hose 182 or other fluid passageway. In some examples, the length and size of the hose 182 is provided to allow for manual spraying operation (e.g., localized spraying) on any surface of the container 140. As such, an individual is able to perform a focused spraying operation on a portion of the container 140, before, during, or after cleaning by the nozzles 126. For example, areas of the container 140 that need additional preparation work or cleaning can be sprayed using the handheld nozzle sprayer 180. In some examples, the handheld nozzle sprayer 180 allows for different spray patterns and dispensing of fluid at different flow rates or pressures.

The cleaning system 100 is configured to apply fluid to the container 140 to thereby clean an exterior surface of the container 140. For example, a cleaning agent (e.g., industrial soap) is applied to the container 140 as it is rotated, followed by applying pressurized water to the pre-soaped container as the container 140 is rotated. In some examples, pressurized water is first applied, followed by the cleaning agent, and then another application of pressurized water. The planar surface 104 is capable of rotating at different speeds, for example, at one speed when applying the cleaning agent and at another speed when applying the pressurized water. However, in some examples, the planar surface 104 rotates at the same speed during different cleaning stages or operations, such as during, pre-soak, soaping, and pressurized washing. The spinning operation and the spraying operation in some examples is manually controlled. In other examples, these operations are semi-automatically controlled or automatically controlled.

Various configurations of the cleaning system 100 will now be described. The planar surface 104 is sized and shaped to support one or more configurations or types of containers 140. The planar surface 104 is generally configured to support a single container 140 and can have a length and/or width that is greater than, less than, or equal to the length or width of the container 140. The planar surface 104 in the illustrated example is octagonal having longer straight sides than angled sides. That is, the planar surface 104 is square shape having angled corners in this example. In other examples, the length or width, as well as the thickness of the planar surface 104 is configured to maintain and support the container 140 thereon while being rotated and cleaned as described in more detail herein.

The vertical spray portion 118 and the horizontal spray portion 120 similarly are configured based on the configuration or dimensions of the container 140. For example, the length of each of the vertical spray portion 118 and the horizontal spray portion 120 is provided to allow for complete spray coverage of the container 140 from the sets of nozzles 126. That is, the vertical spray portion 118 and the horizontal spray portion 120 are arranged to allow the nozzles 126 to spray pressurized fluid on the exposed exterior surfaces of the container 140. For example, the vertical spray portion 118 and the horizontal spray portion 120 are configured such that the nozzles 126 are capable of spraying fluid on all sides and the top of the container 140. This nozzles 126 are arranged and have a spray pattern (e.g., different angled spray patterns) that provide spray coverage to all sides and the top of the container 140, including edges and corners.

In some examples, the nozzles 126 are located at positions that extend beyond the sides and the top of the container 140 to provide sufficient spray coverage and pressure. Additionally, the vertical spray portion 118 and the horizontal spray portion 120 are arranged relative the planar surface 104 to not only allow the container 140 to rotate within the cleaning area 130, but at a sufficient distance to ensure a desired or required spray pressure to be applied to the exterior surface of the container 140 that is being cleaning. It should be noted that applying a spray pressure to the exterior surface of the container 140 can include different pressures for different operations or applications (e.g., pre-soak, cleaning liquid spray, high pressure wash, rinse pressure, etc.). The pressures can be controlled by any suitable means.

In some examples, additional or different spray portions or members than the vertical spray portion 118 and the horizontal spray portion 120 are provided. For example, another vertical spray portion 118 opposite the vertical spray portion 118 shown in the figures can be provided. In some examples, another horizontal spray portion 120 is provided opposite to horizontal spray portion 120 shown in the figures, such as arranged to provide a spray along a bottom of the container 140. In this configuration, the planar surface 104 is configured to allow spray there through (e.g., holes or spaces in the planar surface 104). Additionally, the vertical spray portion 118 and the horizontal spray portion 120 in some examples are not arranged in the same plane, but can be offset, angled, or provided in different planes relative to each other.

In some examples, multiple sets of vertical spray portions 118 and horizontal spray portions 120 and corresponding planar surfaces 104 as described herein are provided to allow for cleaning of multiple containers 140 simultaneously or concurrently. In some examples, the multiple vertical spray portions 118 and multiple horizontal spray portions 120 are configured to provide a conveyor type cleaning system that moves the containers 140 to different cleaning stations defined by the multiple vertical spray portions 118 and multiple horizontal spray portions 120. In the illustrated example that defines a single cleaning station having the cleaning area 130, the containers 140 can be loaded and unloaded onto and off the planar surface 104 using any suitable means (e.g., forklift, conveyor, etc.). As should be appreciated, the open sided design of the cleaning system 100 allows for easier, more efficient, and more effective cleaning of containers 140 of many different types, sizes, configurations, etc. than closed sided cleaning systems or cleaning systems having enclosures in which the containers 140 are cleaned.

In one particular configuration of the cleaning system 100, a three-quarter (¾) inch water supply line feeds the first reservoir 132, which is a two-hundred thirty (230) gallon water holding tank with a bull float or other sensor. In one example, the bull float is mounted on the tank at the two-hundred ten (210) gallon mark. The bull float in configured to shut off water supply to the tank (first reservoir 132) once the water demand is met. The pump 138 pulls water from the holding tank via a two and one-quarter inch pipe, which in one example is a flex pipe. A sensor is positioned at the forty gallon mark on the holding tank, which will cut power to the pump 138 when water supply is low to avoid damage occurring to the pump 138.

The pump 138 is operated, for example, by the motor 114, which in one example is an electric three horsepower, 3,450 rpm, single-phase motor. The motor 114 feeds a booster pump 144 (e.g., a xylem brand thirty-five gallons per minute booster pump) to a pressure gauge 146 (see FIG. 9). From the pressure gauge 146, fluid passes to a fluid passage splitter 148, such as a one-inch galvanized T pipe. From the splitter 148, fluid flows to one or more valves 152, such as two one-inch brass ball valves that provide selective control of the flow of the fluid as described in more detail herein.

In one example, the valve 152 is coupled to fluid tube, illustrated as a hose 154 (e.g., a one-inch, twenty-five-foot, 150 psi hose) and to another valve 156 (see FIGS. 5 and 6), such as a one-inch two-way brass valve that then is reduced to smaller fluid passageway, which in one example is a ⅜-inch galvanized discharge used for high volume blasting via the nozzles 126. In one example, after (downstream of) the valve 156, another hose 158, for example a one-inch, 150 psi hose feeds the spray bars 160 of the vertical spray portion 118 that includes the vertical support member 122 and the horizontal spray portion 120 that includes the horizontal support member 124. This configuration allows for high volume spray or fluid blasting of the container 140 using a plurality of spray bars 160, which in some examples are configured as box washer spray bars.

The spray bars 160 in one example are mounted to an L-shaped frame (e.g., a four inch by four inch by one-quarter inch steel L-shaped frame) formed by the vertical support member 122 and the horizontal support member 124. One or more of the spray bars 160 in some examples are multi-section configurations, such as two sections formed from 1.5 inch stainless steel box tubing. In one particular configuration, the vertical spray bar 160*a* is sixty inches in length with ten spray tips illustrated as ten nozzles 126. In this example, the nozzles 126 are spaced out or apart every six-inches. The horizontal spray bar 160*b* is forty-three inches in length with seven spray tips (seven nozzles 126) spaced out or apart every six-inches. In some examples, all the spray tips embodied as the nozzles 126 are one-quarter inch MEG 15-15.

In one example, the rotating platform illustrated as the planar surface 104 of the support member 102 is a four foot by four foot steel diamond plate that is $^{3}/_{16}$ inch thick. The rotating platform is driven by the motor 114 (e.g., an electric one-half horsepower motor). The motor 114 in some examples powers the drive member 112 that includes a gear reduction box (e.g., a Hytol 4A gear reduction gear box) with a chain sprocket (e.g., two and one-half inch chain sprocket) on the gear box with a chain 162 (e.g., size 50 chain) coupled to a sprocket 164 (e.g., a seven-inch sprocket) with a one an one-eighth inch shaft 166. As described in more detail herein, underneath the rotating platform, namely the planar surface 104, are the rotatable members 110, illustrated as four three-inch wheel casters to stabilize the platform. The rotating platform is positioned a defined distance above the ground, which in one example is twenty-three inches above the ground.

It should be noted that the various components are configured to operate in wet conditions. For example, the chain 162 has a moisture resistant coating in some examples that is useful in the cleaning area 130. The chain 162 in some examples is a steel chain that is substantially not subject to linear expansion or stretching over time and durable to support and rotate the container 140.

The pump 138 and the rotating platform each have an activation member, such as a start/stop button. As such, selective operation of the various components is provided, such as activation of the spinning operation and/or the spray operation. In the illustrated example, the second reservoir 136 (see FIG. 8) is a thirty-gallon soap induction tank with a pump 168 (e.g., a 3.5 gallons per minute, sixty psi Remco pump) that pulls a soap solution using a hose 170 (e.g., a three-quarter inch clear poly hose) to a valve (e.g., a three-quarter inch brass two-way ball valve). The two-way ball valve connects to the spray bar(s) 160*b* (e.g., a three-quarter inch galvanized soap spray bar). The spray bar(s) 160*b* in this example are configured as soap spray bar(s) defining seven spray sections (e.g., seven separate spray bars), each having six spray tips (illustrated as nozzles 126) per section. As described herein, the spray bars 160 are attached to the main L-shaped spray frame.

In operation, containers 140 (e.g., agricultural or seed containers, such as pro boxes) are placed on the rotating platform via a forklift and operator. The operator then turns on the rotating platform, opens either of the two valves 152, 156 following the booster pump, and then turns power on to the pump 138 to begin cleaning or washing. The soap induction tank (second reservoir 136) can be turned on or off as desired or need, for example, when the operator deems it necessary. In some examples, on average, the container 140 is rotated at four revolutions in thirty seconds using approximately 17.5 gallons of water at 100 psi. Once the container 140 has been sprayed for a defined period of time and/or when the container 140 is considered clean (e.g., by visible inspection), the forklift operator removes the container 140 from the platform (planar surface 104) and places the container 140 in an area to dry before storing the container 140. It should be noted that one or more drying members may be used to facilitate drying of the cleaned containers 140, such as one or more fans.

Figure 11:
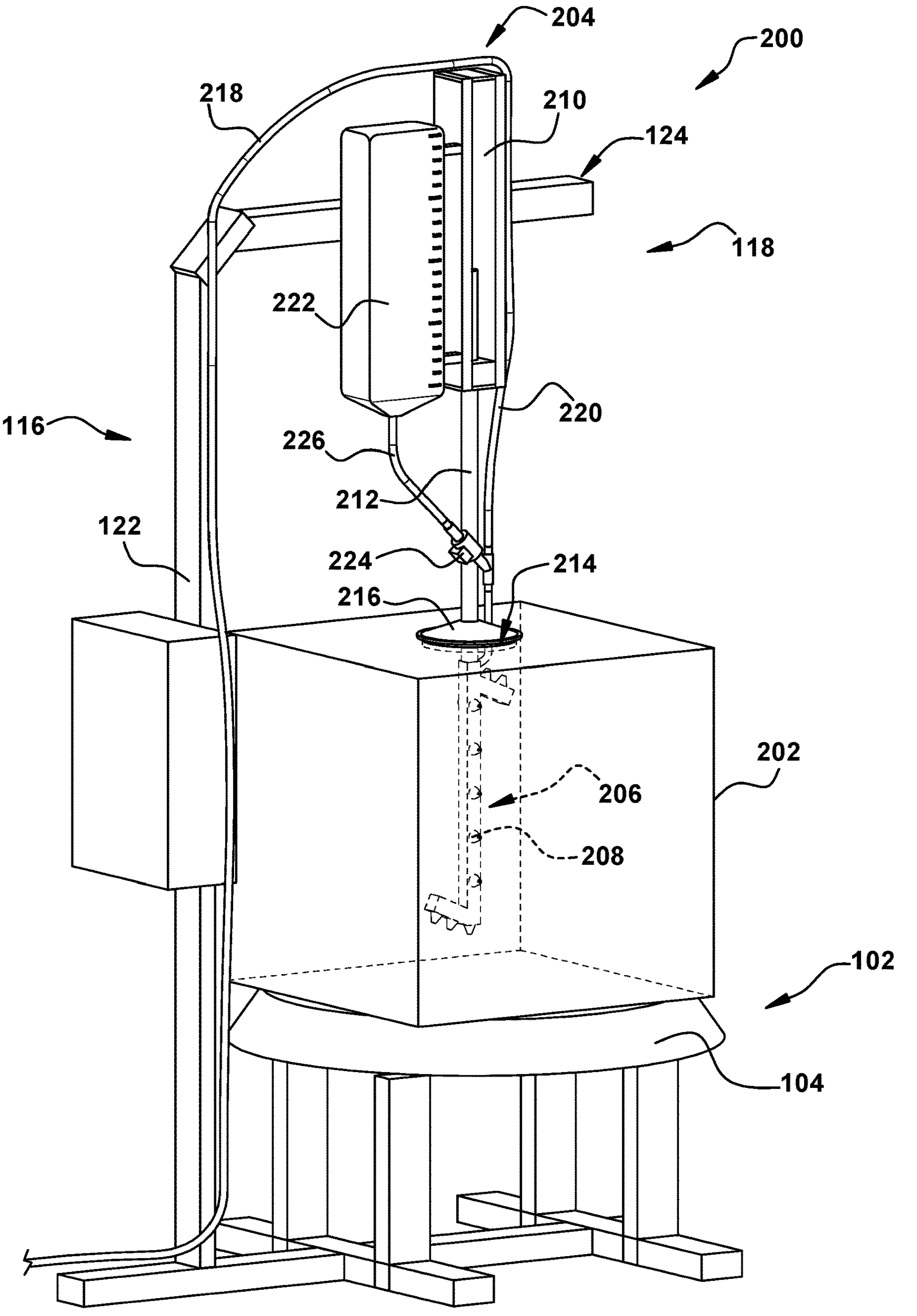
FIG. 11 is a diagram of an example cleaning system according to another implementation having a movable arm.
Figure 12:
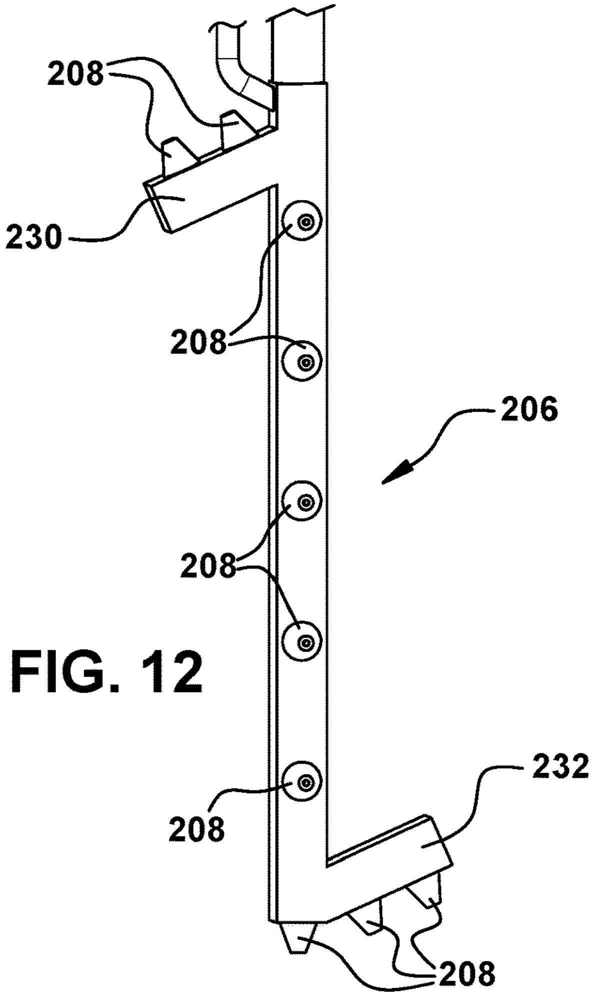
FIG. 12 is a diagram illustrating a portion of the movable arm of the cleaning system of FIG. 11.
Figure 13:
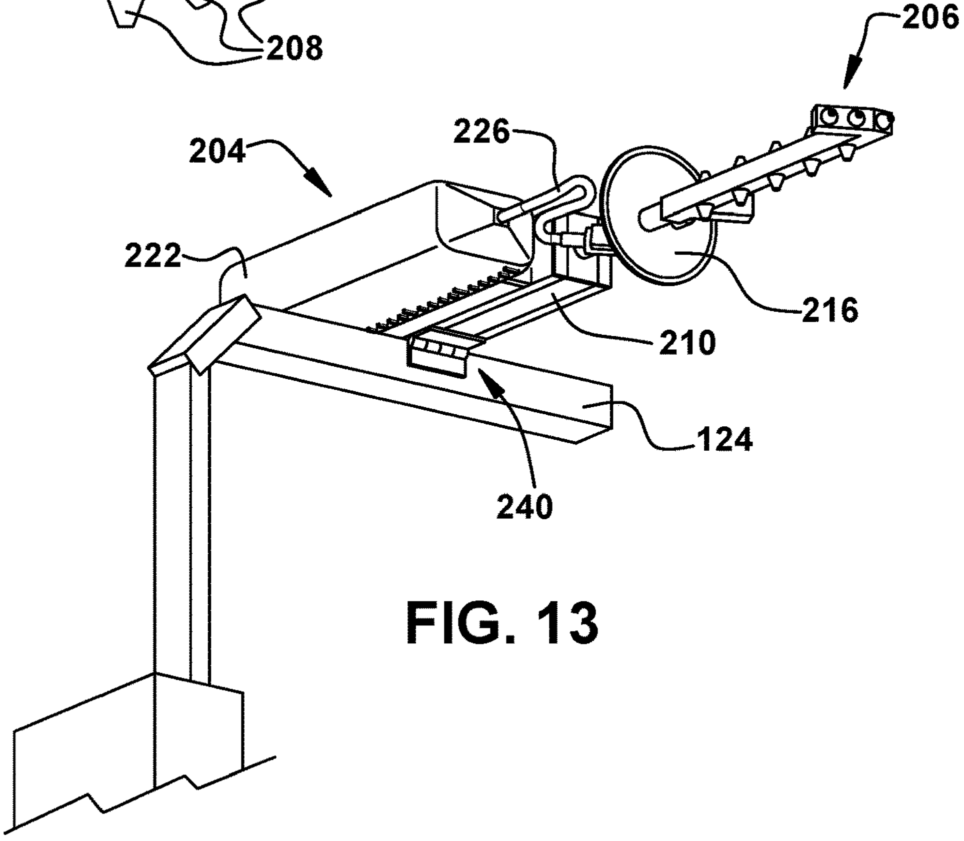
FIG. 13 is a diagram illustrating the movable operation of the cleaning system of FIG. 11.

Variations and modifications are contemplated. For example, the cleaning system 100 of FIGS. 1-10 is configured to apply pressurized fluid to an exterior surface of the container 140 to thereby clean the exterior surface, In other examples, such as illustrated in FIGS. 11-13, a cleaning system 200 is configured to alternatively or optionally apply pressurized fluid to an interior surface of a container, such as the container 140 or another container, to thereby clean the interior surfaces. FIGS. 11-13 illustrate example implementations of a system that may utilize one or more portions of the aspects and examples described herein, which can be used with one or more portions or aspects of other examples. As such, and as should be appreciated, one or more implementations are configured to apply pressurized fluid to only the interior of the container. One or more implementations are configured to apply pressurized fluid to only the exterior of the container. One or more implementations are configured to apply pressurized fluid to the exterior and optionally the interior of the container. As should be appreciated, these variations are encompassed by the herein described examples and may be combined as desired or needed. It should be noted that like numerals represent like parts in the various examples.

In the implementation illustrated in FIGS. 11-13, a cleaning system 200 is shown that allows, for example, for washing large agricultural boxes, particularly the interior or internal surfaces of the agricultural boxes (e.g., liquid fertilizer containers), although other uses are contemplated, such as for also clearing the exterior or external surfaces of agricultural seed boxes, as described in more detail. The cleaning system 100 includes the support member 102 that is configured to support and rotate a container 140 to be cleaned. The support member 102 as described in more detail herein. That is, the cleaning system 200 allows for rotation of a container 202 similar to rotation of the container 140, such as a liquid fertilizer container, to rotate or spin about an axis centered within the cleaning system 200 as pressurized fluid is being applied to an interior surface of the container 202.

The cleaning system 200 further includes the cleaner dispensing portion 116 that is configured to spray water or other cleaning agents within the container 202 supported on the planar surface 104. In the illustrated example, in addition to the cleaner dispensing portion 116 that includes the vertical spray portion 118 and the horizontal spray portion 120 configured to apply pressurized fluid an exterior of the container 202, a movable spray portion 204 is configured to apply pressurized fluid to the interior of the container 202. The movable spray portion 204 is capable of insertion with the container 202 to apply the pressurized fluid therein as described in more detail herein. It should be appreciated that although the movable spray portion 204 is shown in combination with the vertical spray portion 118 and the horizontal spray portion 120, in some implementations, only the movable spray portion 204 is provided without the vertical spray portion 118 and the horizontal spray portion 120.

The movable spray portion 204 includes a spray arm 206 having a plurality of nozzles 208. In some examples, the plurality of nozzles 208 are configured or operate similar to the plurality of nozzle 126. The spray arm 206 is configured to be inserted or moved into the container 202, such as to extend within the interior of the container 202. In the illustrated example, the spray arm 206 is coupled or forms part of an actuator 210 that is operable to translate or move the spray arm 206 vertically upward and downwards (as viewed in FIG. 11) into and out of the container 202. That is, the actuator 210 allows for removable insertion of the spray arm 206 into the container 202. In one example, the actuator 210 is a linear electric actuator, which provides feedback in some examples. It should be appreciated that any suitable actuation device can be used that allows the spray arm 206 to be movably positioned relative to the container 202.

In various examples, the spray arm 206 is coupled with a shaft 212 of the actuator 210 that moves the spray arm 206. For example, the shaft 212 is movable in and out within a distance range. That is, the actuator 210 has a stroke length that defines the extent of the movement of the shaft 212. In various examples, the actuator 210 is configured such that the stroke length allows for complete insertion of the spray arm 206 into the container 202 through an opening 214 (illustrated on a top of the container 202) to allow the nozzle 208 to emit pressurized fluid within an interior of the container 202. In one or more examples, the actuator 210 is configured to move the spray arm 206 a distance within the container 202 such that the nozzles 208 are able to emit the pressurized fluid on all surfaces (e.g., top, bottom, and side surfaces) of the interior of the container 202. As such, with the spray arm 206 positioned within the container 202, as the container 202 is rotated, the nozzles 208 are able to apply fluid on all the interior surfaces of the container 202.

In some examples, a flange 216 or other cover or seal is configured to be positioned within the opening 214. The flange 216 allows for insertion of the spray arm 206 into the container 202 while sealing the opening 214. In some examples, the flange 216 is coupled with or forms part of the shaft 212, the spray arm 206 (e.g., at a top of the spray arm 206) or other part that is positioned within the opening 214 as the spray arm 206 is inserted within the container 202. That is, in some examples, the flange 216 moves with the spray arm 206 as the spray arm 206 is positioned within the container 202, such that the flange 216 seals the opening 214 when the spray arm 206 is within the container 202. The flange 216 is complementary to the opening 214 is various examples, for example, sized and shaped to be received in and seal the opening 214. In some examples, the flange 216 is configured to allow sealing of openings 214 of different sizes and/or shapes.

In some examples, the flange 216 is configured to be coupled with or positioned within the opening 214 separated from the spray arm 206. For example, the flange 216 is provided in or on the opening 214 and has a portion that can be opened or expanded to allow the spray arm 206 to pass through the body of the flange 216 into the container 202, while sealing the opening 214, particularly from spray resulting during the cleaning of the interior of the container 202.

In various examples, the flange 216 thereby acts as a cap that covers the opening 214 and is complementary to the spray arm 206 (and the shaft 212) to allow passage of the spray arm 206 into the container 202, which is then sealed by the flange 216. In one example, the flange 216 is a rubber member that seals the opening 214 when the spray arm 206 is positioned within the container 202. It should be noted that the flange 216 can be configured to be positioned within or on the opening 214 before insertion of the spray arm 206 into the container 202, or positioned within or on the opening after the insertion of the spray arm 206 into the container 202 (e.g., surround the shaft 212 at the opening 214 after insertion of the spray arm 206 into the container 202).

The spray arm 206 is supplied with fluid through a supply line 218 connected thereto. In some examples, the supply line 218 is embodied as or is fluidly coupled to the hose 154 and/or one or more of the first reservoir 132 and the second reservoir 136. That is, the supply line 218 is in fluid communication with one or more of a water supply and cleaning agent supply (e.g., a tank cleanser solution) in various examples. In some examples, the supply line 218 is coupled to an additional or different source of fluid or an additional or different reservoir. The supply line 218 in various examples supplies a pressurized fluid therethrough and to the spray arm 206 to allow cleaning of the interior of the container 202 as described in more detail herein. For example, the cleaning of the interior of the container 202 or the exterior of the container 202 (or the container 140) can be performed as a multi-cleaning or multi-step or stage process, such as a triple rinse process, wherein a fluid rinse is first performed, followed by a cleaning agent or solution application, followed by a fluid rinse. As should be appreciated, during one or more, or all of these steps or stages, the container 202 (or the container 140) is rotated as described in more detail herein.

In the illustrated example, a connection line 220 is configured to connect the supply line 218 to the spray arm 206 and is also connected to an induction tank 222 via a valve 224 and a supply line 226 of the induction tank. That is, the valve 224 is operable to fluidly connect and disconnect the induction tank 222 from the spray arm 206. As such, the valve 224 in various examples is configured to operate as an on/off valve for the induction tank 222. In some examples, the valve 224 is an electric two way valve that allow fluid flow to and from the induction tank 222. However, any suitable valve arrangement or fluid switching arrangement can be used.

In some examples, the induction tank 222 is fluidly connected to the spray arm 206 to supply a cleaning fluid or solution within the connection line 220. That is, in some examples, the induction tank 222 is configured to allow mixing of the cleaning fluid or solution with water from the supply line 218 and applied to the interior of the container 202. In operation, the arrangement allows for "pulling" fluid (e.g., cleaning fluid or solution) from the induction tank 222 and mixed with the water supply (which can be mixed at different levels or concentrations), which is facilitated in some example by a forty-five degree angled portion of the supply line 226 that connects to the connection line 220. In some examples, the induction tank 222 is refillable, such as to replenish the cleaning fluid or solution stored therein, such as using a removable cap or lid (e.g., screw on cap) of the induction tank 222.

As can be seen more clearly in FIG. 12, the plurality of nozzles 208 are arranged along a body 228 of the spray arm 206. The number, location, and relative positioning of the various nozzles 208 can be varied as desired or needed, for example, based on a desired or required cleaning application, type of container, size of container, etc. In the illustrated example, five nozzles 208 are illustrated on a main portion of the body 228 with two nozzles 208 on a top extension 230 of the body 228 and three nozzles 208 on a bottom extension 232. In this example, the spray arm 206 is thirty-six inches in length and five inches in width to ends of the extensions 230, 232. In various examples, the nozzles 208 are positioned in an offset arrangement, such as shifted axially or radially around the body 228 such that the nozzles 208 are directed or aimed at different directions from the body 228. Thus, in some examples, the nozzle 208 can be oriented in different directions, and can also be oriented at different angles to provide a desired spray pattern or coverage. In some examples, multiple nozzles 208 can be provided on different surfaces of the body 228. For example, in implementations having a body 228 that is tubular or multi-sided, the different surfaces (e.g., different sides) can have the same or different patterns or positioning of nozzles 208. In some examples, the nozzles 208 are arranged in a continuous pattern along and across the different surfaces. In some examples, the nozzles 208 are arranged in a same pattern along each surface.

In some examples, the nozzles 208 are arranged to provide maximum coverage of the spray using a pattern configured across all sides of the body 228. It should be noted that the shape and size of the spray arm 206, including the body and extensions 230, 232, can be varied as desired or needed. That is, the cross-sectional shape, profile, etc. of the spray arm 206 can be varied as desired or needed. In the illustrated example, the extensions 230, 232 are angled spray projections that extend from the body 228. The extensions 230, 232 are angled in opposite directions in some examples, illustrated as a downward angle for the extension 230 and an upward angle for the extension 232 as viewed in FIG. 12. The angle of the extensions 230, 232, as well as the shape, size, orientation, etc. of the extensions 230, 232 can be varied as desired or needed. Additional or fewer extensions can be provided in some examples.

In various examples, the spray arm 206 is hollow or has a supply line therein that allows fluid to flow into the spray arm 206 and out of the nozzles 208. That is, the supply of water or a cleaning agent or solution is allowed to flow into the spray arm 206 and out of the nozzles 208 (similar to other arms and structure as described in more detail herein). The spray arm 206 in various examples is in a fixed position when inserted within the container 202 in some examples. The spray arm 206 is configured is other examples to allow some small movement (e.g., swaying movement) when positioned within the container 202.

In various examples, the movable spray portion 204 is configured, in addition to being movable to insert the spray arm 206 within the container 202, to move between an operational position as shown in FIG. 11 and a storage or non-operational position as shown in FIG. 13. That is, the entire movable spray portion 204 is configured to move relative to the horizontal spray portion 120 or other support member of the cleaning system 200. In the illustrated example, the movable spray portion 204 is pivotally coupled to the horizontal support member 124 at a hinge point 240 to allow for pivoting movement between the positions shown in FIGS. 11 and 13. For example, when not in use, as shown in FIG. 13, the movable spray portion 204 is pivoted or rotated upward and away from the location of the container 202. In this position, the movable spray portion 204 is moved so as to not block spray from the vertical spray portion 118 and the horizontal spray portion 120, such as when cleaning an exterior or outside surface of the containers as described in more detail herein. In this position, the movable spray portion 204 is pivoted upward to essentially lay on top of the horizontal support member 124 and perpendicular thereto. That is, the movable spray portion 204 rotates about the side surface of the horizontal support member 124 into a plane parallel to the plane of the horizontal support member 124, bur oriented perpendicular thereto.

In the non-operational position, the movable spray portion 204 is locked or secured to the horizontal support member 124. For example, a pin or other locking mechanism or means is used to secure the movable spray portion 204 to the horizontal support member 124. In some examples, the movable spray portion 204 is thereby prevented from rotating or pivoting about the hinge point 240 when placed in the locked orientation. That is, the secured in position and maintained in that position out of the way of other portions of the cleaning system 200.

The movable spray portion 204 can be coupled to different portions or locations of the cleaning system 200, such as on different sides or at different locations along the horizontal support member 124 (or the vertical support member 122). In some examples, the movable spray portion 204 is positioned on a side opposite to the nozzles 126 of the horizontal spray portion 120. As such, when use of the movable spray portion 204 is desired, the movable spray portion 204 is pivoted downward to allow extension of the spray arm 206 into the container 202 as described in more detail herein. It should be noted that in some examples, the range of motion of the movable spray portion 204 can be varied as desired or needed. In one example, the movable spray portion 204, when moved into the operational position, rests or abuts against the along the horizontal support member 124 and is maintained in positon by gravity. In other examples, the movable spray portion 204 is coupled or secured to the horizontal support member 124 when in the operational configuration (e.g., by a pin or other locking mechanism).

In other examples, the movable spray portion 204 is positioned on a top of the horizontal support member 124. In these examples, the movable spray portion 204 is configured to rotate about the horizontal support member 124 in addition to pivoting. That is, the movable spray portion 204 rotates and then is pivoted downward when the operational position.

The cleaning system 200 is configured to apply fluid to the interior and/or exterior of one or more containers, which may be the same or different containers. For example, the nozzles 126 of the vertical spray portion 118 and the horizontal spray portion 120 are configured to clean an exterior surface of a container as the container is rotated as described in more detail herein. Additionally or alternatively, the nozzles 208 of the spray arm 206 are configured to clean an interior surface of a container as the container is rotated as described in more detail herein. The various examples can be used in combination or separately in the same or different systems to clean the same or different types of containers that are used to store and/or transport different materials.

Figure 14:
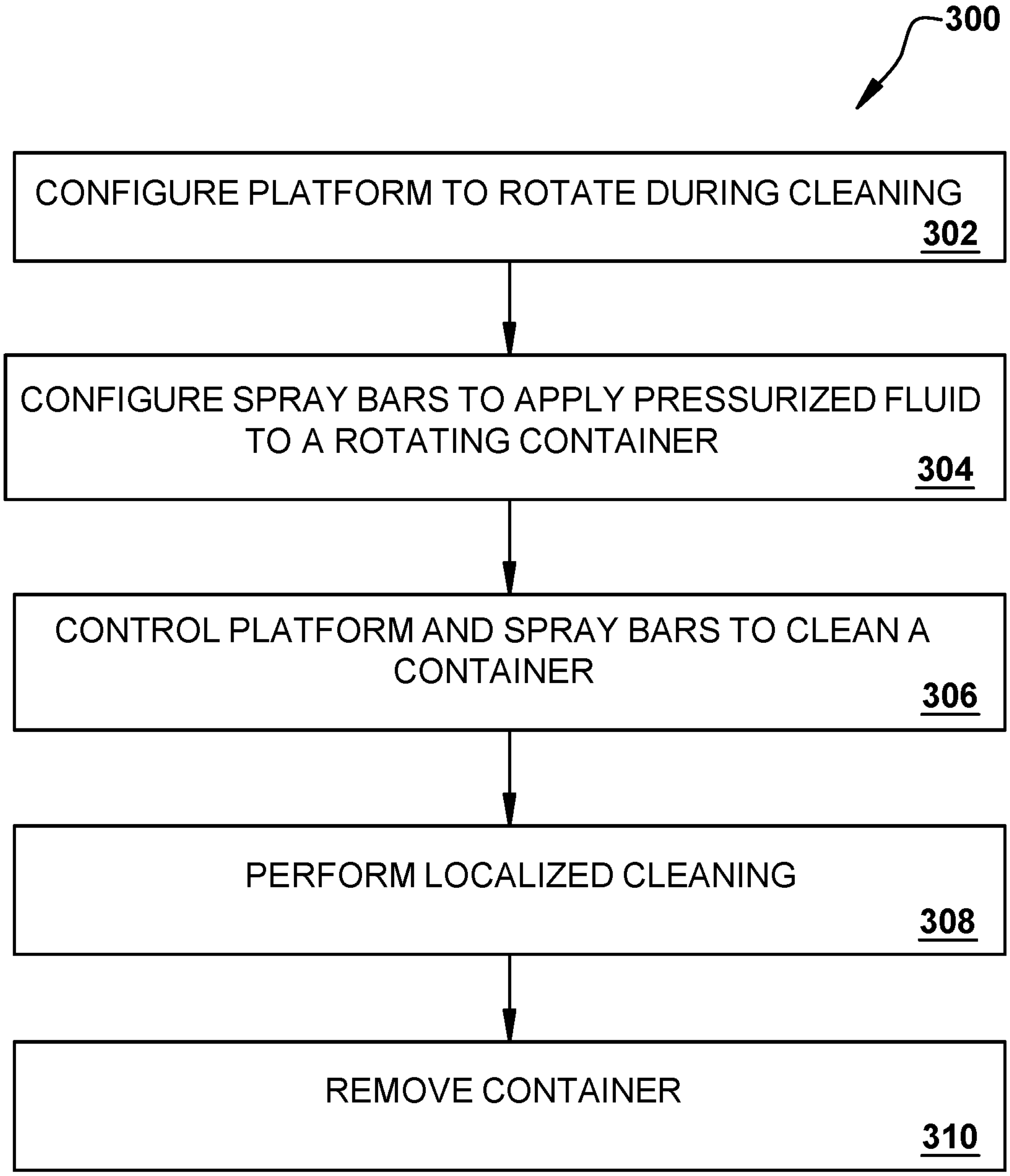
FIG. 14 illustrates an example of a method for container cleaning according to an implementation.

A container cleaning system, which in various examples is a seed box cleaning system and/or a liquid fertilizer container cleaning system, is thereby provided and operates to clean containers in various examples. For example, the container cleaning system is configured as the cleaning system 100 and is useful in washing large agricultural seed storage and transport boxes. The flowchart 300 of FIG. 14 illustrates operations involved in container cleaning according to one implementation. In some examples, the operations of the flowchart 300 are performed using the cleaning system 100 as described in more detail herein. The flowchart 300 commences at operation 302, which includes configuring a platform to rotate during cleaning. For example, as described in more detail herein, the planar surface 104 is caused to rotate while a cleaning operation is being performed.

At operation 304, one or more spray bars are configured to apply pressurized fluid to the rotating container, namely a container that has been positioned on the platform. As described herein, differently configured spray bars can be used, such as a set of spray bars to apply a cleaning agent or soap at one pressure and another set of spray bars to apply water at another pressure. The pressure can be varied as desired or needed, such as based on the desired cleaning level. In some examples, various tanks or reservoirs are fluidly coupled to the one or more spray bars to provide a supply of a cleaning agent, water, etc. The spray bars can be arranged or configured as desired or needed, such as in different spray array configurations. In some examples, a movable spray arm (e.g., the spray arm 206) or other spraying member can additionally or alternatively be used.

The platform and spray bars are controlled at 306 to clean the container, such as the container 140 that has been loaded onto the platform by a forklift. In one example, the container 140 is individually placed on the platform by a transport vehicle (e.g., a forklift). As described herein, other means to load the container 140 on the cleaning system 100 are contemplated, for example a powered conveyor (not shown).

The platform (e.g., planar surface 104) is activated to cause rotation thereof when the container 140 is placed thereon for cleaning. The sprays bars are selectively controlled to apply a cleaning agent and water, which can be applied at different pressures and at different times, or at the same pressure and at the same time. For example, soap application spray bars and pressurized water spray bars can be activated at the same time, such that simultaneous operation is provided. As another example, soap application is performed prior to pressurized water application. In some examples, overlap of the end of the soap application and the beginning of the pressurized water application is provided. The activation and time of operation of the platform and spray bars in some examples is performed based on one or more defined time periods. That is, the spinning of the container 140, the application of the cleaning agent, the application of pressurized water, and post cleaning rotation, are each performed for defined time periods in some examples. One or more of the time periods can be varied or user defined, or manually set, in some examples. In some examples, one or more operations are performed as the container 140 is stationary.

In various examples, the components are controlled to provide a fluid spray around the container 140 with fluid supplied through one or more pipes, hoses, and/or channels that are in fluid communication with one or more tanks or reservoirs that include associated valves to selectively provide fluid (e.g., pressurized fluid spray) through the nozzles 126. The cleaning operation can be performed in one or multiple cycles, such as multiple cleaning cycles. For example, one or more pumps are in fluid communication with one or more reservoirs and spray bars through hoses and controlled valves. With selective supply of pressurized fluid to one or more of the spray bars, and through coordinated rotational movement of the container 140 on the platform, effective and sufficient washing of the container 140 can be accomplished. In some examples, the spray arm 206 can be controlled to clean an interior of a container, such as the interior of the container 202, as described in more detail herein.

In some examples, localized cleaning is performed at operation 308. For example, using the handheld nozzle sprayer 180, which can be selectively activated, application of pressurized water from the first reservoir 132 is applied to specific areas (e.g., very dirty areas) of the container 140. This localized cleaning can be performed, prior to, during, or after the cleaning operation performed by the spray bars. In some examples, the handheld nozzle sprayer 180 can selectively apply the cleaning agent or water.

Once clean, the container 140 (or the container 202) is removed at operation 310. For example, once the rotating platform and the spray bars have been deactivated, the container 140 (or the container 202) is removed and moved to a drying and/or storage area.

Figure 15:
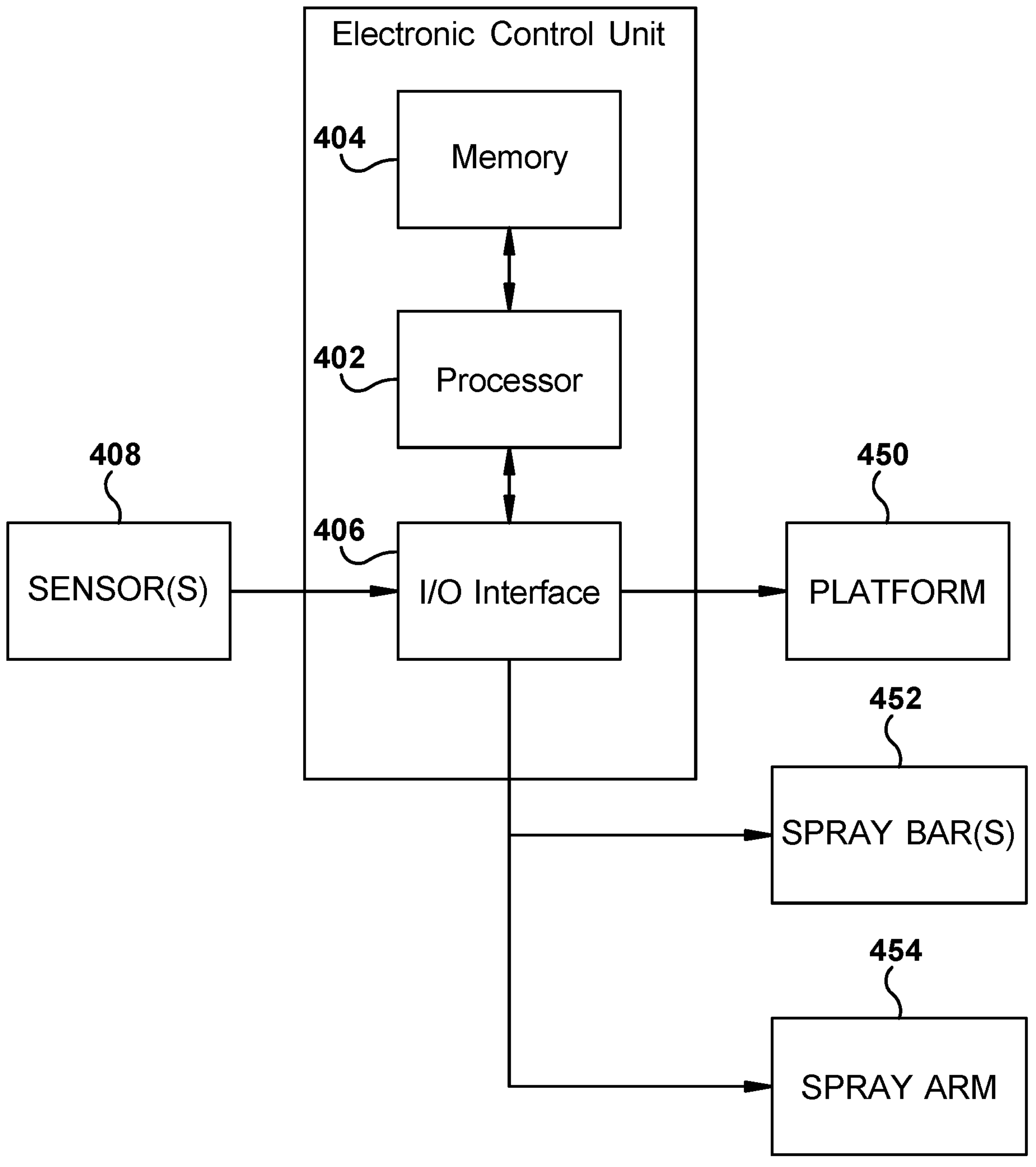
FIG. 15 is a block diagram of an electronic control unit usable with a cleaning system according to an implementation.

One or more components of the cleaning system 100 or 200 can be coupled with a controller, such as an electronic control unit (ECU) 400 as shown in FIG. 15, or other device that controls operation of one or more components of the cleaning system 100. The ECU 400 in some examples is in electrical communication with the one or more components (e.g., one or more motors, drives, valves, etc.). The ECU 400 is operable in some examples to perform a defined (e.g., predefined or preprogrammed) cleaning routine on the container 140 (e.g. a seed box) or the container 202 (e.g., liquid fertilizer container). In other examples, the ECU 400 is operable to allow activation and deactivation of one or more components, such as based on a user input (e.g., activation of a button or switch). For example, the ECU 400 can control selective activation of the rotation of the platform or spraying by one or more of the spray bars. In some examples, the ECU 400 causes selective rotation of the shaft 166 about an axis of rotation to rotate the container 140 or the container 202 on the planar surface 104. The ECU 400 in some examples is configured (e.g., preprogrammed) to perform a desired sequence of operations including, but not limited to, movement of the box and initiation of one or more spray cycles. It should be noted that the ECU 400 can include other activation and monitoring functions, for example, the activation of fluid control valves to provide fluid to the spray bars, the various powered drives, and the pump(s).

It should be noted that although one or more examples are described in connection with washing an agricultural seed box, other uses for washing different containers and other objects as well as other functions besides washing with water or cleaning solution are contemplated. The spray or dispersion of other fluids through different nozzles and transfer devices may be used.

Thus, the ECU 400 is configured to control or operate one or more components of a cleaning system, such as a rotating platform 450 that be embodied or configured as the planar surface 104 of the cleaning system 100 or 200, and one or more spray bars 452, embodied or configured as the spray bars 160 of the cleaning system 100, or a spray arm 454, embodied or configured as the spray arm 206 of the cleaning system 200. The ECU 400 includes a plurality of electrical and electronic components that provide power, operational control, and protection to the components and modules within the ECU 400. In particular, the ECU 400 includes, among other things, an electronic processor 402 (e.g., a programmable microprocessor, microcontroller, or similar device), non-transitory, machine-readable memory 404, and an input/output interface 406. The electronic processor 402 is communicatively coupled to the memory 404. The electronic processor 402 is configured to retrieve from the memory 404 and execute, among other things, instructions related to the control processes and methods described herein, such as to control the cleaning of the container 140 or the container 202. In some examples, the ECU 400 includes additional, fewer, or different components. The ECU 400 may also be configured to communicate with external systems including, for example, engine controls and/or operator controls.

The ECU 400 in the illustrated example is communicatively coupled to one or more sensors 408, such as for sensing different operating conditions, operating states, etc. For example, one or more of the sensors 408 can be configured to sense fluid levels in one or more reservoirs, a rotational speed of the platform etc. The input/output interface 406 facilitates communication between the ECU 400 and the platform 450, spray bar(s) 452, spray arm 454, and other components of the cleaning system 100 or 200. Through the input/output interface 406, the ECU 400 is configured to control the operation (e.g., turning on and off) of one or more of the components of the cleaning system, which may include receiving a user input, as described in more detail herein. The input/output interface 406 also coordinates input communications to the ECU 400 from the sensors 408.

Thus, the ECU 400 is configured to control one or more components of the cleaning system 100, among other systems. For example, the ECU 400 in some examples is operable to control the platform 450 and the spray bar(s) 452 (or the spray arm 454) as illustrated in the flowchart 300 of FIG. 14.

It should be noted that the memory 404 in some examples includes any computer-readable media. In one example, the memory 404 is used to store and access instructions configured to carry out the various operations disclosed herein. In some examples, the memory 404 includes computer storage media in the form of volatile and/or nonvolatile memory, removable or non-removable memory, data disks in virtual environments, or a combination thereof. In one example, the processor(s) 402 includes any quantity of processing units that read data from various entities, such as the memory 404. Specifically, the processor(s) 402 are programmed to execute computer-executable instructions for implementing aspects of the disclosure. In one example, the instructions are performed by the processor(s) 402 and the processor 402 is programmed to execute instructions such as those illustrated in the flowcharts discussed herein and depicted in the accompanying drawings.

It should also be noted that computer readable media comprises computer storage media and communication media. Computer storage media include volatile and nonvolatile, removable, and non-removable memory implemented in any method or technology for storage of information such as computer readable instructions, data structures, program modules, or the like. Computer storage media are tangible and mutually exclusive to communication media. Computer storage media are implemented in hardware and exclude carrier waves and propagated signals. Computer storage media for purposes of this disclosure are not signals per se.

While various spatial and directional terms, including but not limited to top, bottom, lower, mid, lateral, horizontal, vertical, front and the like are used to describe the present disclosure, it is understood that such terms are merely used with respect to the orientations shown in the drawings. The orientations can be inverted, rotated, or otherwise changed, such that an upper portion is a lower portion, and vice versa, horizontal becomes vertical, and the like.

The word "exemplary" is used herein to mean serving as an example, instance or illustration. Any aspect or design described herein as "exemplary" is not necessarily to be construed as advantageous over other aspects or designs. Rather, use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Further, at least one of A and B and/or the like generally means A or B or both A and B. In addition, the articles "a" and "an" as used in this application and the appended claims may generally be construed to mean "one or more" unless specified otherwise or clear from context to be directed to a singular form.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. Of course, those skilled in the art will recognize many modifications may be made to this configuration without departing from the scope or spirit of the claimed subject matter.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein.

Any range or value given herein can be extended or altered without losing the effect sought, as will be apparent to the skilled person.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure.

As used in this application, the terms "component," "module," "system," "interface," and the like are generally intended to refer to a computer-related entity, either hardware, a combination of hardware and software, software, or software in execution. For example, a component may be, but is not limited to being, a process running on a processor, a processor, an object, an executable, a thread of execution, a program and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device, carrier or media. Of course, those skilled in the art will recognize many modifications may be made to this configuration without departing from the scope or spirit of the claimed subject matter.

In addition, while a particular feature of the disclosure may have been disclosed with respect to only one of several implementations, such feature may be combined with one or more other features of the other implementations as may be desired and advantageous for any given or particular application. Furthermore, to the extent that the terms "includes," "having," "has," "with," or variants thereof are used in either the detailed description or the claims, such terms are intended to be inclusive in a manner similar to the term "comprising."

The implementations have been described, hereinabove. It will be apparent to those skilled in the art that the above methods and apparatuses may incorporate changes and modifications without departing from the general scope of this invention. It is intended to include all such modifications and alterations in so far as they come within the scope of the appended claims or the equivalents thereof.

What is claimed is:

1. A cleaning system comprising:

a support member having a platform configured to support an agricultural container thereon, the platform configured to rotate with the agricultural container supported thereon;

at least one reservoir configured to store a fluid;

a vertical spray portion arranged along a first axis and fluidly coupled to the at least one reservoir;

a horizontal spray portion arranged along a second axis fluidly coupled to the at least one reservoir, wherein the first axis is different than the second axis;

a plurality of spray bars coupled to the vertical spray portion and the horizontal spray portion, each spray bar of the plurality of spray bars including a plurality of nozzles configured to spray the fluid therefrom, wherein the plurality of spray bars are operable to spray the fluid on an exterior of the agricultural container as the agricultural container is rotated by the platform; and a handheld nozzle sprayer fluidly coupled to the at least one reservoir via a hose and configured to perform localized spraying of the agricultural container, the handheld nozzle sprayer configured to perform the localized spraying prior to operation of the plurality of spray bars, during operation of the plurality of spray bars, and after operation of the plurality of spray bars.

2. The cleaning system of claim 1, wherein the plurality of spray bars comprises a first set of spray bars configured to spray a cleaning agent and a second set of spray bars configured to spray a pressurized water, wherein the first set of spray bars is different than the second set of spray bars.

3. The cleaning system of claim 2, wherein the first set of spray bars comprises a first type of nozzles and the second set of spray bars comprises a second type of nozzles, wherein the first type is different than the second type.

4. The cleaning system of claim 1, wherein the platform is configured to rotate at four revolutions in thirty seconds and the plurality of nozzles are configured to spray the fluid therefrom at 100 psi.

5. The cleaning system of claim 1, wherein one or more spray bars coupled to the vertical spray portion is sixty inches in length and includes ten nozzles each spaced six inches apart, and the one or more spray bars coupled to the horizontal spray portion is forty-three inches in length and includes seven nozzles each spaced six inches apart box.

6. The cleaning system of claim 1, wherein the agricultural container comprises a seed box.

7. The cleaning system of claim 1, wherein the plurality of spray bars comprises sets of spray bars arranged in parallel along each of the vertical spray portion and the horizontal spray portion.

8. The cleaning system of claim 1, wherein rotation of the platform and activation of the plurality of spray bars is controlled by one or more manual user inputs.

9. The cleaning system of claim 1, wherein rotation of the platform and activation of the plurality of spray bars is controlled based on a predefined cleaning routine.

10. The cleaning system of claim 1, wherein the vertical spray portion and the horizontal spray portion define an L-shaped frame having a vertical support member forming the vertical spray portion and a horizontal support member forming the horizontal spray portion, and the L-shaped frame is spaced a distance from the support member to allow cleaning of different configurations of agricultural containers.

11. The cleaning system of claim 10, wherein the L-shaped frame defines an open ended cleaning area.

12. The cleaning system of claim 1, wherein the plurality of spray bars comprises spray bars of different lengths.

13. The cleaning system of claim 1, further comprising a pump fluidly coupled to the plurality of spray bars and the handled nozzle sprayer to provide pressurized fluid to the spray bars and the handheld nozzle.

14. The cleaning system of claim 1, wherein the support member includes a plurality of legs each having a rotatable member on which the platform is movably supported.

15. The cleaning system of claim 1, wherein the cleaning system is an open sided design.

16. A cleaning system comprising:

a support member having a platform configured to support an agricultural container thereon, the platform configured to rotate with the agricultural container supported thereon;

at least one reservoir configured to store a fluid;

a vertical spray portion arranged along a first axis and fluidly coupled to the at least one reservoir;

a horizontal spray portion arranged along a second axis fluidly coupled to the at least one reservoir, wherein the first axis is different than the second axis;

a plurality of spray bars coupled to the vertical spray portion and the horizontal spray portion, each spray bar of the plurality of spray bars including a plurality of nozzles configured to spray the fluid therefrom, wherein the plurality of spray bars are operable to spray the fluid on an exterior of the agricultural container as the agricultural container is rotated by the platform; and a movable spray portion coupled to the horizontal spray portion, the movable spray portion having a spray arm configured to be positioned within the container and operable to spray the fluid on an interior of the agricultural container as the agricultural container is rotated by the platform.

17. The cleaning system of claim 16, wherein the movable spray portion comprises an actuator configured to cause translational movement of the spray arm to position the spray arm within the container, and having a flange configured to seal an opening of the container.

18. The cleaning system of claim 16, wherein the movable spray portion is configured to pivot relative to the horizontal spray portion.

19. The cleaning system of claim 16, wherein the movable spray portion further comprises an induction tank fluidly coupled to the spray arm, the induction tank storing a cleaning agent therein.

20. An open sided seed box cleaner comprising:

a rotatable platform configured to support a seed box thereon;

a first storage tank storing water;

a second storage tank storing a cleaning agent;

a vertical spray portion arranged along a first axis;

a horizontal spray portion arranged along a second axis, wherein the first axis is different than the second axis;

a plurality of spray bars coupled to the vertical spray portion and the horizontal spray portion, one or more spray bars of the plurality of spray bars fluidly coupled to the first storage tank and one or more different ones of the plurality of spray bars fluidly coupled to the second storage tank, each spray bar of the plurality of spray bars including a plurality of nozzles configured to spray one of water or the cleaning agent therefrom, wherein the plurality of spray bars are operable to spray the water or the cleaning agent on an exterior of the seed box as the seed box is rotated by the rotatable platform;

a handheld nozzle sprayer fluidly coupled to the at least one reservoir via a hose and configured to perform localized spraying of the agricultural container, the handheld nozzle sprayer configured to perform the localized spraying prior to operation of the plurality of spray bars, during operation of the plurality of spray bars, and after operation of the plurality of spray bars; and a pump fluidly coupled to the plurality of spray bars and the handled nozzle sprayer to provide pressurized fluid to the spray bars and the handheld nozzle.

* * * * *